United States Patent
Callard et al.

(10) Patent No.: US 9,565,061 B2
(45) Date of Patent: Feb. 7, 2017

(54) SYSTEM AND METHOD FOR SELECTING OPERATING PARAMETERS IN A COMMUNICATIONS SYSTEM

(71) Applicant: Huawei Technologies Co., Ltd., Shenzhen (CN)

(72) Inventors: Aaron James Callard, Ottawa (CA); Ngoc Dung Dao, Ottawa (CA); Hang Zhang, Nepean (CA); Ho Ting Cheng, Stittsville (CA); Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 99 days.

(21) Appl. No.: 14/511,708

(22) Filed: Oct. 10, 2014

(65) Prior Publication Data

US 2015/0024802 A1    Jan. 22, 2015

Related U.S. Application Data

(62) Division of application No. 13/366,188, filed on Feb. 3, 2012, now Pat. No. 8,862,185.

(51) Int. Cl.
    *H04L 12/24*    (2006.01)
    *H04W 24/02*    (2009.01)
    (Continued)

(52) U.S. Cl.
    CPC .......... *H04L 41/0823* (2013.01); *H04W 24/02* (2013.01); *H04W 88/08* (2013.01);
    (Continued)

(58) Field of Classification Search
    CPC .. H04L 41/0823; H04L 1/0003; H04L 1/0009; H04L 1/0026; H04L 1/0077; H04W 24/02; H04W 88/08
    See application file for complete search history.

(56) References Cited

U.S. PATENT DOCUMENTS

| 2002/0016169 A1 | 2/2002  | Sykes |
| 2004/0266442 A1 | 12/2004 | Flanagan et al. |

(Continued)

FOREIGN PATENT DOCUMENTS

| CN | 101355376 A | 1/2009 |
| CN | 102075941 A | 5/2011 |

OTHER PUBLICATIONS

Extended European Search Report Received in European Application No. 13743412, Mailed Nov. 3, 2014. 8 pages.

(Continued)

*Primary Examiner* — Erica Navar
(74) *Attorney, Agent, or Firm* — Slater Matsil, LLP

(57) ABSTRACT

A method for configuring a first base station within a cluster in a communications system having a plurality of cluster includes optimizing an operating parameter of the first base station in accordance with first utility function results from a first utility function associated with the first base station and second utility function results from a second utility function associated with a second base station within the cluster, the first utility function results and the second utility function results according to multiple settings for the operating parameter of the first base station, a first initialized setting of the operating parameter for the second base station, and a second initialized setting of the operating parameter for an external base station outside the cluster. The method also includes sharing the optimized operating parameter with the external base station.

28 Claims, 12 Drawing Sheets

(51) Int. Cl.
*H04W 88/08* (2009.01)
*H04L 1/00* (2006.01)
*H04L 1/20* (2006.01)

(52) U.S. Cl.
CPC .......... *H04L 1/0003* (2013.01); *H04L 1/0009* (2013.01); *H04L 1/0026* (2013.01); *H04L 1/0077* (2013.01); *H04L 1/20* (2013.01)

(56) References Cited

U.S. PATENT DOCUMENTS

| | | | |
|---|---|---|---|
| 2005/0003824 A1* | 1/2005 | Siris | H04L 47/10 455/452.1 |
| 2010/0056215 A1 | 3/2010 | Gorokhov et al. | |
| 2010/0238884 A1* | 9/2010 | Borran | H04W 16/10 370/329 |
| 2011/0064014 A1 | 3/2011 | Li et al. | |
| 2012/0257664 A1 | 10/2012 | Yue et al. | |
| 2013/0084864 A1 | 4/2013 | Agrawal | |

OTHER PUBLICATIONS

Extended European Search Report Received in European Application No. 13743412.2, Mailed Nov. 3, 2014. 8 pages.
"PCT International Search Report and Written Opinion of the International Searching Authority" Applicant: Huawei Technologies Co., Ltd., mailing date: May 9, 2013, 10 pages.
Yu, W., et al., Multicell Coordination via Joint Scheduling, Beamforming and Power Spectrum Adaptation, IEEE, Apr. 2011, 9 pages.
•Preliminary CoMP evaluationresults for Scenarios 3 and 4,• 3GPP TSG-RAN WG1 #65, R1-111685, May 9-13, 2011, 5 pages, Barcelona, Spain.

* cited by examiner

SYSTEM AND METHOD FOR SELECTING OPERATING PARAMETERS IN A COMMUNICATIONS SYSTEM

This is a divisional application of U.S. application Ser. No. 13/366,188, which was filed on Feb. 3, 2012 and is incorporated herein by reference.

TECHNICAL FIELD

The present invention relates generally to digital communications, and more particularly to a system and method for selecting operating parameters in a communications system.

BACKGROUND

In many second generation (2G) and third generation (3G) communications systems, a base station (also commonly referred to as a controller, a communications controller, a NodeB, an evolved NodeB, and the like) makes its own decision on how to select users (also commonly referred to as mobile stations, subscribers, terminals, user equipment, and the like) for transmission. Additionally, operating parameters, such as transmit power level, data rate, and the like, may be left unchanged for an extended period of time.

In an attempt to improve network capacity, multiple-input multiple-output (MIMO) techniques have been developed, wherein base stations and/or mobile stations are equipped with multiple antennas (for example, multiple transmit antennas, multiple receive antennas, or both multiple transmit antennas and multiple receive antennas). A commonly used MIMO technique involves the precoding of a transmission to shape the transmission towards its intended recipient. The precoding can also be applied to a MIMO receiver. The precoding information used in a MIMO communications system is also a operating parameter.

Another technique used to improve network capacity is coordinated multipoint processing (CoMP). In general, CoMP schemes employ multiple transmitters and/or receivers to jointly optimize transmission parameters. In a communications system utilizing CoMP, the CoMP configuration is another operating parameter.

SUMMARY OF THE INVENTION

Example embodiments of the present invention which provide a system and method for selecting operating parameters in a communications system.

In accordance with an example embodiment of the present invention, a method for configuring a first base station within a cluster in a communications system having a plurality of cluster is provided. The method includes optimizing an operating parameter of the first base station in accordance with first utility function results from a first utility function associated with the first base station and second utility function results from a second utility function associated with a second base station within the cluster, the first utility function results and the second utility function results according to multiple settings for the operating parameter of the first base station, a first initialized setting of the operating parameter for the second base station, and a second initialized setting of the operating parameter for an external base station outside the cluster. The method also includes sharing the optimized operating parameter with the external base station.

In accordance with another example embodiment of the present invention, a method for configuring a first internal base station within a cluster in a communications system having a plurality of clusters is provided. The method includes using a first utility function to generate a first result according to a first parameter setting of an operating parameter of the first internal base station within the cluster, an internal initialized parameter setting of the operating parameter of a second internal base station within the cluster, and an external initialized parameter setting of the operating parameter of an external base station outside the cluster. The method also includes using the first utility function to generate a second result according to a second parameter setting of the operating parameter of the first internal base station within the cluster, the internal initialized parameter setting of the operating parameter of the second internal base station, and the external initialized parameter setting of the operating parameter of the external base station. The method additionally includes receiving a third result from the second internal base station, the third result generated by a second utility function using the first parameter setting of the first internal base station, the internal initialized parameter setting of the second internal base station, and the external initialized parameter setting of the external base station. The method further includes receiving a fourth result from the second internal base station, the fourth result generated by the second utility function using the second parameter setting of the internal base station, the internal initialized parameter setting of the second internal base station, and the external initialized parameter setting of the external base station. The method also includes selecting one of the first and second parameter settings of the internal base station according to a comparison of a summation of the first result and the third result with a summation of the second result and the fourth result, thereby producing a first selected one, and using the first selected one as a new initialized parameter setting for the internal base station.

In accordance with another example embodiment of the present invention, a first base station is provided. The first base station includes a processor, and a transmitter operatively coupled to the processor. The processor optimizes an operating parameter of the first base station in accordance with first utility function results from a first utility function associated with the first base station and second utility function results from a second utility function associated with a second base station within a cluster, the first utility function results and the second utility function results according to multiple settings for the operating parameter of the first base station, a first initialized setting of the operating parameter for the second base station, and a second initialized setting of the operating parameter for an external base station outside the cluster. The transmitter shares the optimized operating parameter with the external base station.

One advantage of an embodiment is that the complexity in determining operating parameter settings of base stations in a communications system is reduced by partitioning the communications system into a plurality of clusters. Therefore, the determining of the operating parameter settings may be accomplished without requiring the availability of a large amount of computational resources.

A further advantage of an embodiment is that both a centralized technique and a partially distributed technique for determining the operating parameter settings of base stations are presented. Therefore, significant implementation flexibility is available.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to determining operating parameter settings for base stations of a communications system that is partitioned into a plurality of clusters. For example, a cluster controller selects or coordinates the selection of settings for operating parameters of base stations in its cluster as part of an optimization process according to initialized or previous settings of operating parameters of base stations in the cluster as well as initialized or previous settings of operating parameters of base stations in other clusters. The selected settings operating parameters of base stations in the cluster are shared with other clusters, which may lead to additional selections of settings of the operating parameters. For example, a base station upon receiving its selected settings of the operating parameters may estimate conditions for its served user equipments and then schedules its user equipments and sets their data rates based on the estimated conditions.

The present invention will be described with respect to example embodiments in a specific context, namely a Third Generation Partnership Project (3GPP) Long Term Evolution (LTE) compliant communications system supporting MIMO and/or CoMP operation. The invention may also be applied, however, to other standards compliant communications systems, such as those that are compliant to IEEE 802.16, WiMAX, and the like, as well as non-standards compliant communications systems.

Figure 1A:
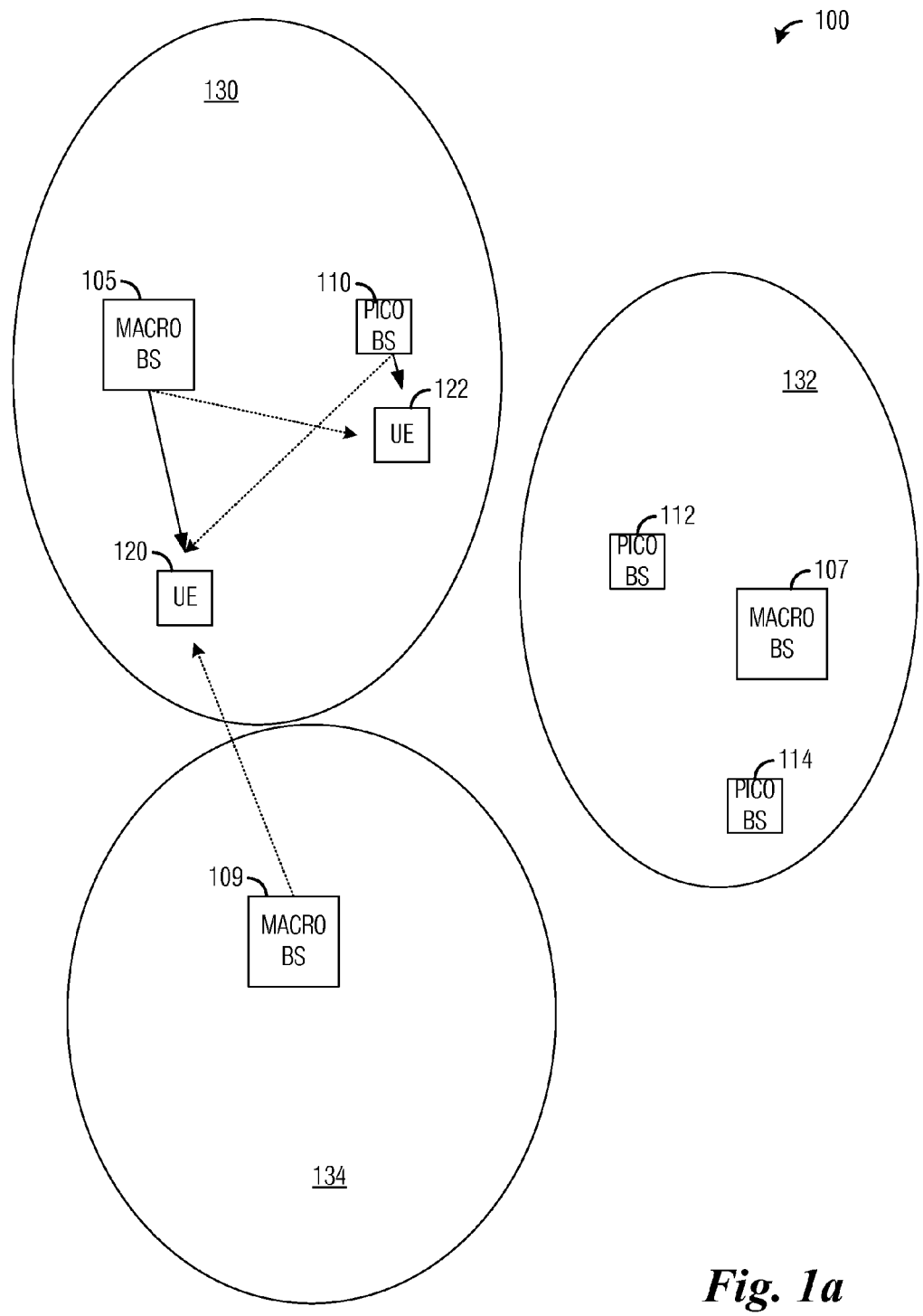
FIG. 1a illustrates an example communications system according to example embodiments described herein.

FIG. 1a illustrates a communications system 100. Communications system 100 includes a plurality of base stations which may or may not have different transmit power capabilities. As an example, some base stations may be classified as full transmit power base stations such as a macro base stations (macro BS) including macro BS 105, macro BS 107, and macro BS 109. While other base stations may be classified as low power base stations, such as pico base stations (pico BS) including pico BS 110, pico BS 112, and pico BS 114. Another example of a low power base station is a femto cell.

Communications system 100 also includes a plurality of user equipment (UE), such as UE 120 and UE 122. As shown in FIG. 1a, macro BS 105 is transmitting to UE 120 and pico BS 110 is transmitting to UE 122. However, transmissions from macro BS 105 may also impact UE 122, while transmissions from pico BS 110 may also impact UE 120. Furthermore, transmissions from macro BS 109 may also impact UE 120.

The base stations of communications system 100 may be partitioned into a plurality of non-overlapping clusters. In general, a cluster may include one or more base stations, and due to the non-overlapping property, a single base station belongs to only one cluster. A cluster with multiple base stations may be referred to as a CoMP set. The base stations in a cluster may have the same or different identification numbers. As shown in FIG. 1a, a first cluster 130 includes macro BS 105 and pico BS 110, a second cluster 132 includes macro BS 107, pico BS 112, and pico BS 114, and a third cluster 134 includes macro BS 109. It is noted that FIG. 1 illustrates an illustrative example of a plurality of non-overlapping clusters for communications system 100 and that other configurations of non-overlapping clusters are possible for communications system 100.

Figure 1B:
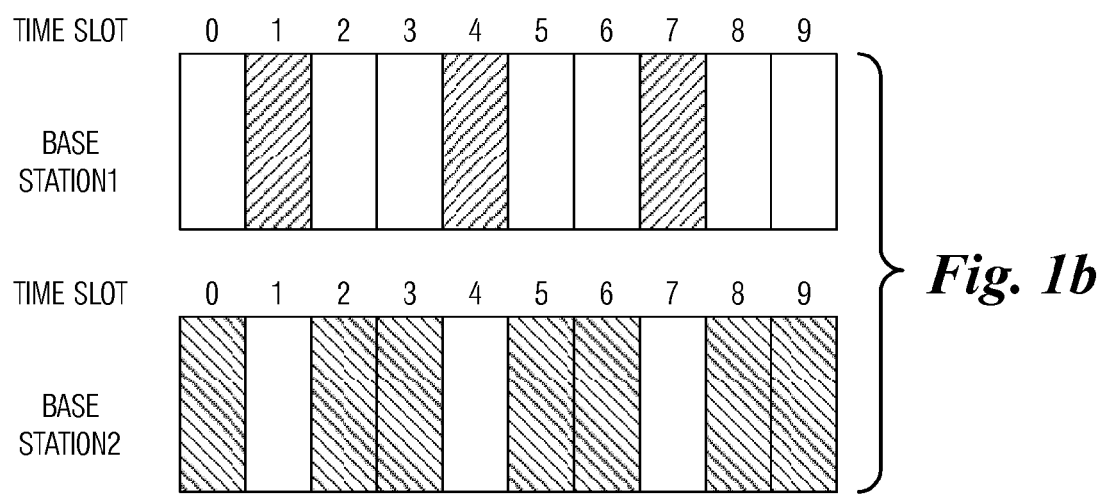
FIG. 1b illustrates an example diagram of transmit power of two base stations according to example embodiments described herein.

FIG. 1b illustrates a diagram 150 of transmit power of two base stations. Diagram 150 depicts an almost blank subframe (ABS) technique for 10 time slots. In time slots 1, 4, and 7, base station 1 transmits ABS subframes. Therefore, in these subframes, there is no or very little interference from base station 1 to the UEs of base station 2, therefore, base station 2 may transmit to its UEs at higher data rates.

Although the discussion focuses on a communications system being partitioned into a plurality of non-overlapping clusters, the example embodiments presented herein may be operable with overlapping clusters, as well as a combination of non-overlapping and overlapping clusters. Therefore, the discussion of non-overlapping clusters should not be construed as being limiting to either the scope or the spirit of the example embodiments.

Figure 2A:
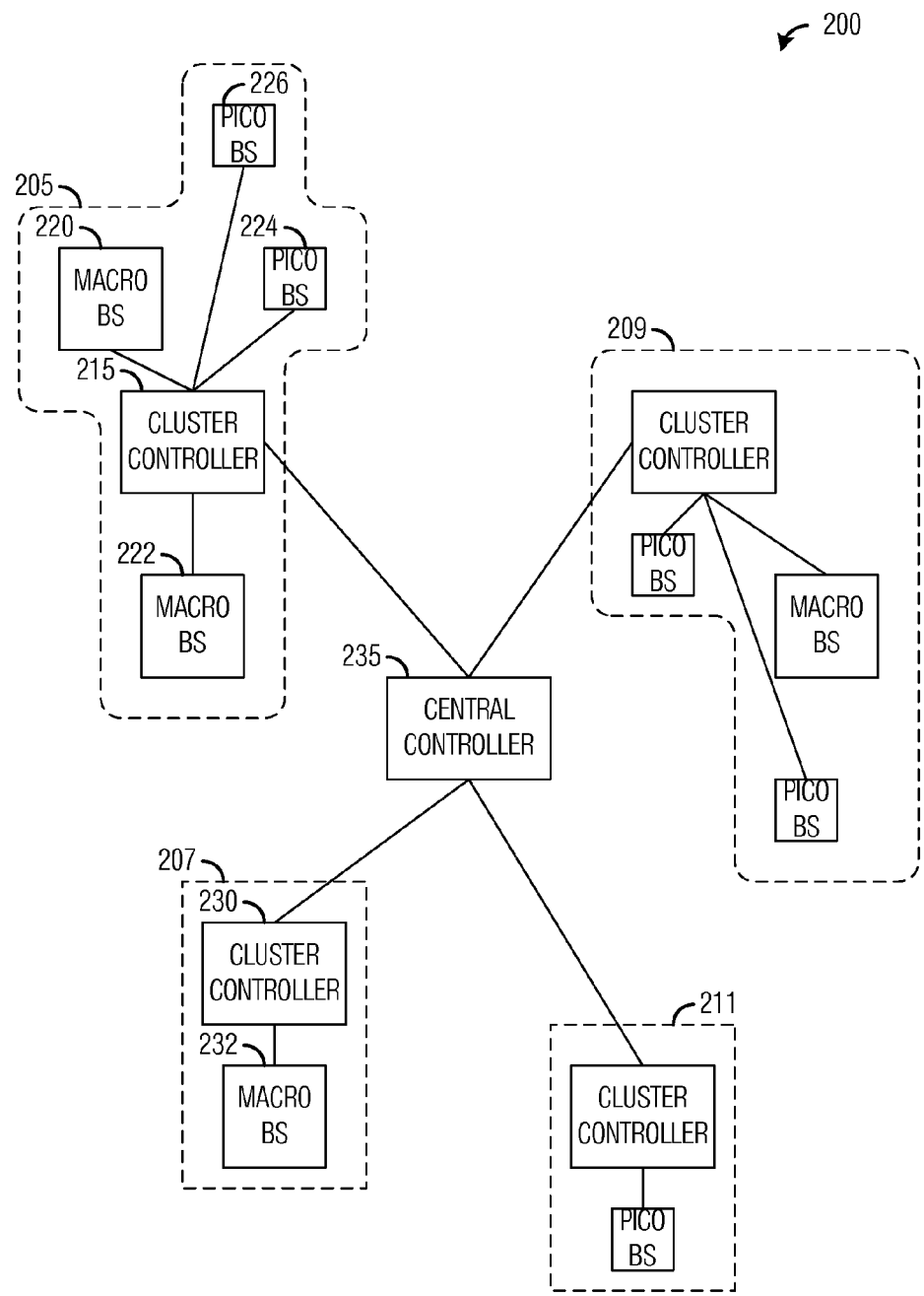
FIG. 2a illustrates an example communications system with a central controller, wherein communications system is partitioned into a plurality of non-overlapping clusters according to example embodiments described herein.

FIG. 2a illustrates a communications system 200 with a central controller, wherein communications system 200 is partitioned into a plurality of non-overlapping clusters. Communications system 200 includes clusters 205, 207, 209, and 211. According to a first example embodiment, each cluster includes a cluster controller that is responsible for determining operating parameter settings for base stations within its cluster. Furthermore, a cluster controller may also coordinate with other cluster controllers and/or a central controller to share operating parameter settings. As an example, cluster 205 includes cluster controller 215 coupled to macro BS 220, macro BS 222, pico BS 224, and pico BS 226, while cluster 207 includes cluster controller 230 coupled to macro BS 232. According to a second example embodiment, base stations in a subset of base stations in a communications system is responsible for determining operating parameter settings for themselves.

Communications system 200 also includes a central controller 235. Central controller 235 may be coupled to the cluster controllers of the plurality of non-overlapping clusters in communications system 200. Central controller 235 may be responsible for coordinating the operation of the cluster controllers, coordinating the sharing of operating parameter settings from the cluster controllers, determining when the cluster controllers initiate the determining the operating parameter settings, determining when the cluster controllers stop the determining of the operating parameter settings, and the like. It is noted that a communications system may have multiple central controllers, especially if it there is a large number of clusters. The multiple central controllers may be coupled to each other, they may be arranged in a hierarchical manner, or they may be disjoint.

According to the first example embodiment, the cluster controllers may be coupled to the base stations over a high speed interface, such as an X2 interface. Similarly, the cluster controllers may be coupled to central controller 235 over a high speed interface, such as an X2 interface. However, the coupling of the cluster controllers, the base stations, and the central controller over a high speed interface may also apply to other example embodiments discussed herein.

FIG. 2a illustrates a communications system 250, wherein communications system 250 is partitioned into a plurality of non-overlapping clusters. Communications system 250 includes clusters 255, 257, 259, and 261. However, the cluster controllers in communications system 250 are directly coupled to one another (e.g., with a high speed interface, such as an X2 interface) rather than to a central controller. The cluster controllers themselves may be responsible for coordinating the operation of the cluster controllers, coordinating the sharing of operating parameter settings from the cluster controllers, determining when the cluster controllers initiate the determining of the operating parameter settings, determining when the cluster controllers stop the determining of the operating parameter settings, and the like.

As an example, in a downlink of an orthogonal frequency division multiplexed (OFDM) based communications system, such as 3GPP LTE or 3GPP LTE-A, data to be transmitted to a UE is sent on resource block(s) (RB), with each RB comprising several subcarriers and several OFDM symbols. Operating parameters of a RB include transmit power level p and precoding matrix U. According to an example embodiment, a transmit power level $p_i$ of an i-th base station may be selected from a discrete set of K transmit power levels expressible as $$p \in \{p_1, p_2, \ldots, p_K\}. \quad (1)$$

However, in general, the transmit power level may be taken from a non-discrete set of possible values. While the precoding matrix U may be adaptively designed to match channel characteristics. The precoding matrix U may also be selected from a set of M possible precoding matrices expressible as $$U \in \{U_1, U_2, \ldots, U_M\}. \quad (2)$$

It may be beneficial to express $U_i$ as null directions rather than precoded directions (i.e. vectors $V_i$ for which the transmitted precoder $U_i$ are orthogonal, i.e., $<U_i, V_i> \leq \epsilon$).

According to the first example embodiment, it may be possible to select settings for operating parameters, such as transmit power level, precoder, modulation and coding scheme of transmissions, location of reference signals (e.g., channel state information reference signals), pilot signal boosting level, frequency selective scheduling or frequency diversity scheduling, handover parameter (e.g., range extension, utility values, and the like), antenna tilt, antenna pattern, transmission rank, and the like, according to a utility function F ($p_k$, $U_m$). However, the selecting of settings for the operating parameters according to a utility function may also apply to other example embodiments discussed herein. The utility function may be a mathematical expression of a relationship between the operating parameters and may used to assign settings to the operating parameters. As an example, a utility function may provide an indication of quantitative measure, such as an instantaneous data rate $r_i$ of an i-th UE, or function of the data rate, such as log $$\left(\frac{r_i}{r_{avg}}\right),$$

where $r_{avg}$ is an average data rate of the i-th UE, according to a relationship between the operating parameters. A result of the utility function may be the result of an application of specific operating parameter settings to the utility function. The utility function may be designed so that a set of operating parameters settings may maximize the utility function for a RB group (RBG).

As an example, the selection of a specific operating parameter setting from possible settings of the operating parameter using a utility function and its utility function result, such as instantaneous data rate or a function of instantaneous data rate may be as follows: When a UE sends feedback information, e.g., channel state information (CSI) at an n-th transmission time interval (TTI), or in general, channel quality indicator (CQI), the base stations determine an interference at the n-th TTI, $I_{TTI=n}$, where the interference may be determined according to long term pathloss information (measured by reference signal received power (RSRP) in the downlink or sounding reference signal (SRS) in the uplink, for example). The interference at the n-th TTI is expressible as $$I_{TTI=n} = \sum_{i=1}^{L} P_{i,TTI=n} \times \beta_i,$$

where $\beta_i$ is the pathloss between a UE and neighboring base station BSi, L is the number of neighboring base stations, and $P_{i,TTI=n}$ is the operating parameter setting (e.g., transmit power level) of BSi at the n-th TTI. It is noted that the use of averaging for interference is not precluded in which $P_{i,TTI=n}$ is replaced by a function of the previous operating parameters. As an example, the function may be a sliding window over the TTI for which the UE is to perform interference measurements.

When determining the instantaneous data rate of the UE at a (n+k)-th TTI, the base station may recalculate the interference at the (n+k)-th TTI, which is expressible as $$I_{TTI=n+k} = \sum_{i=1}^{L} P_{i,TTI=n+k} \times \beta_i.$$

Then, from the feedback information, e.g., CQI, which may be in the form of the MCS level, the base station may convert the MCS level into a SINR value at the n-th TTI, $SINR_{TTI=n}$, to account for short term fading. Typically, the conversion of MCS level to SINR value may be performed using a lookup table. An adjusted SINR at the (n+k)-th TTI may then be determined as $$SINR_{TTI=n+k} = SINR_{TTI=n} \times \frac{I_{TTI=n}}{I_{TTI=n+k}}.$$

From the adjusted SINR, the MCS level may be chosen for the UE. Once again, the conversion from the adjusted SINR to the MCS level may be implemented using a lookup table, which may be the same or different from the lookup table used to convert MCS level to SINR value. The MCS level, which by definition specifies a code rate, specifies an instantaneous data rate for the UE. If desired, a function may be applied to the instantaneous data rate. As an example, log $$\left(\frac{r_i}{r_{avg}}\right),$$

where $r_{avg}$ is an average data rate of the i-th UE and $r_i$ is the instantaneous data rate of the i-th UE. The instantaneous data rate or the function of the instantaneous data rate, i.e., the utility function result may be used to select the setting of the operating parameter.

In order to obtain the utility function values for the base station, the utility function values for the various UEs may be selected, e.g., using maximization function. However, other quality of service factors, such as a delay constraint, a retransmission priority, and the like, may be considered.

According to the first example embodiment, there may be a number of ways to select the settings of the operating parameters for the base stations in a cluster. One way to select the settings of the operating parameters is to sequentially select the operating parameter settings for each of the base stations according to an ordering, which may be specific or random, as part of an optimization process. The sequential selection of the operating parameter settings as part of an optimization process are described herein. Another way to select the operating parameter settings is to perform an exhaustive search for the base stations in the cluster. Another way to select the operating parameter settings is to perform an exhaustive search within a locality in combination with a sequential ordering of localities. However, the selecting of settings for the operating parameters for base stations in a cluster may also apply to other example embodiments discussed herein.

According to the first example embodiment, the selection of the settings of the operating parameters may be a multi-step process. A first step may involve joint optimization within a cluster, with an entity within a cluster optimizing operating parameters of base stations within the cluster assuming initialized settings for base stations outside of the cluster. A second step may involve inter-cluster information sharing. After joint optimization to select settings for the operating parameters, the information may be shared with other clusters, through broadcasting, for example. The clusters may make use of the information to perform additional optimization or not.

Figure 3A:
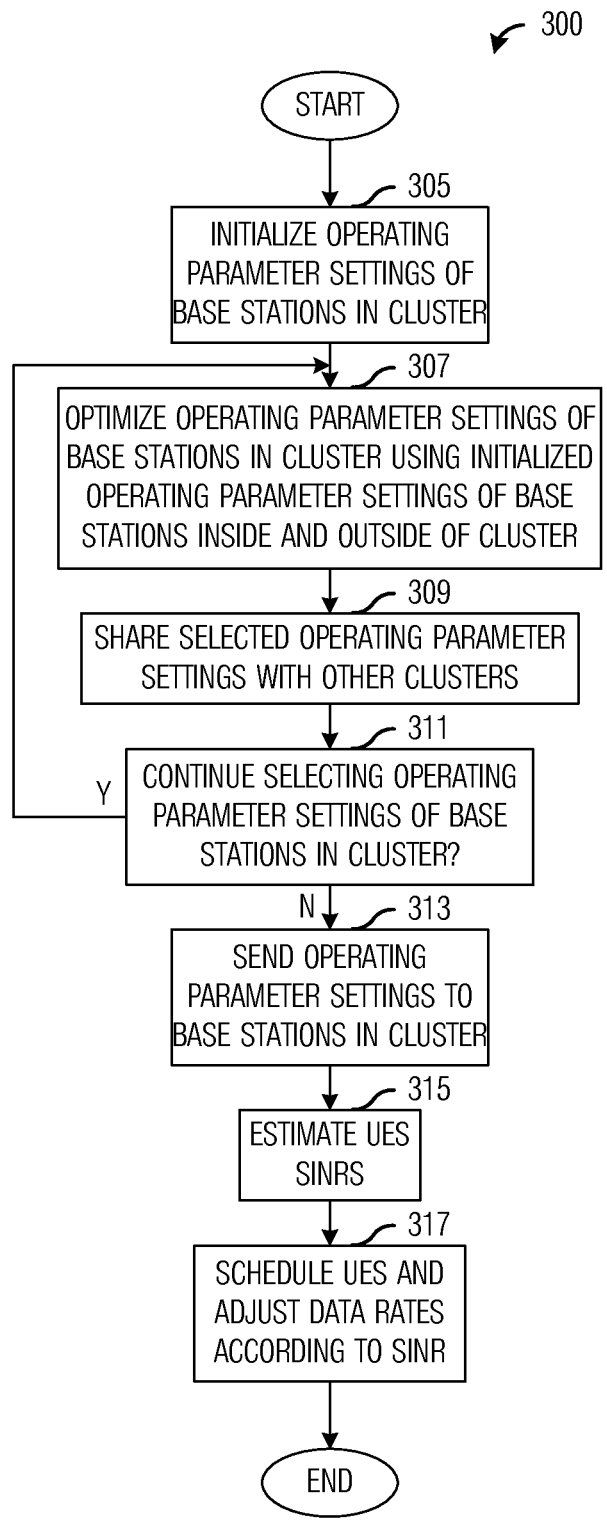
FIG. 3a illustrates an example flow diagram of operations in selecting operating parameter settings of base stations in a cluster of a communications system according to example embodiments described herein.

FIG. 3a illustrates a flow diagram of operations 300 in selecting operating parameter settings of base stations in a cluster of a communications system. Operations 300 may be indicative of operations occurring in a cluster controller, such as cluster controller 215 and cluster controller 230, as the cluster controller participates in determining operating parameter settings for base stations of a communications system.

Operations 300 may begin with an initialization of operating parameter settings for the base stations of the cluster (block 305). According to the first example embodiment, the operating parameters may be set to default settings of the operating parameters upon a first time that the selecting of the settings of the operating parameters is performed, wherein the default settings may be specified by an operator of the communications system, a technical standard to which the communications system adheres, and the like. The initialized operating parameter settings may be used in subsequent settings until actual settings of the operating parameters are selected. However, the setting of the operating parameter to default settings may also apply to other example embodiments discussed herein.

The cluster controller may optimize the operating parameter settings of the base stations in the cluster using the initialized operating parameter settings for the base stations in the cluster as well as the initialized operating parameter settings for base stations outside of the cluster (block 307). According to the first example embodiment, the cluster controller may optimize the operating parameter settings for the base stations in a sequential order according to a selected processing order, and when optimizing the operating parameter settings for an i-th base station, the cluster controller may determine utility function results for each possible operating parameter setting of the i-th base station according to: each possible operating parameter setting of the i-th bases station, initialized operating parameter settings for each base station in the cluster, and initialized operating parameter settings for base stations outside of the cluster. However, the cluster controller optimizing the operating parameter settings in a sequential order may also apply to other example embodiments discussed herein. A detailed discussion of the optimization of the operating parameter settings is provided below.

The cluster controller may share the operating parameter setting for the base stations in the cluster with base stations in other clusters (block 309). The cluster controller may directly share the operating parameter settings with other cluster controllers or it may share the operating parameter settings with a centralized controller.

The cluster controller may perform a check to determine if it should continue selecting operating parameter settings of the base stations in the cluster (block 311). As an example, the cluster controller may continue selecting operating parameter settings of the base stations in the cluster or of some of the base stations in the cluster if the cluster controller has sufficient computational resources and/or time that it can dedicate to the selection. If the cluster controller does not have sufficient computation resources and/or time to select operating parameter settings for all of its base stations, then the cluster controller may select operating parameter settings for a subset of its base stations.

The cluster controller may send the operating parameter settings to the base stations in the cluster (block 313), which may use the operating parameter settings to estimate a metric for the UEs that they are serving (block 315). The base stations may utilize the metrics for the UEs to schedule the UEs, as well as adjust the data rates of the UEs (block 317). A detailed description of the operations of the base stations is provided below.

Figure 3B:
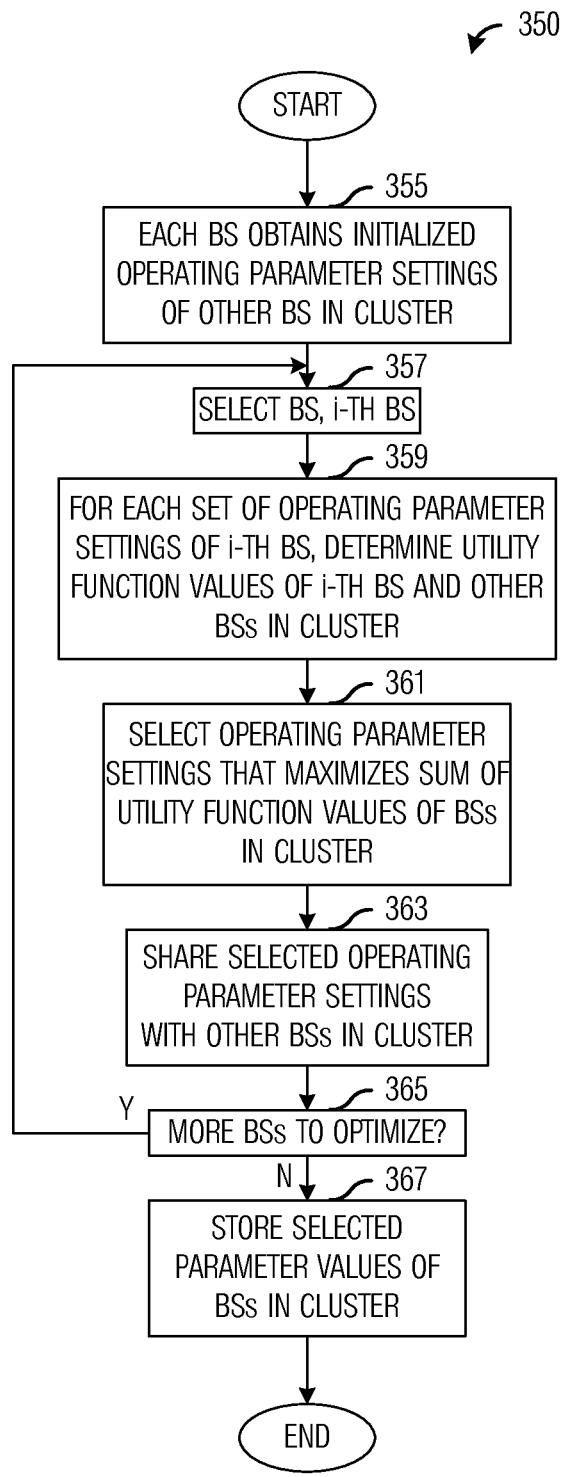
FIG. 3b illustrates an example flow diagram of operations in optimizing operating parameter settings of base stations in a cluster according to example embodiments described herein.

FIG. 3b illustrates a flow diagram of operations 350 in optimizing operating parameter settings of base stations in a cluster. Operations 350 may be indicative of operations occurring in a base station (a distributed algorithm) or a cluster controller (a centralized algorithm) as the base station or the cluster controller selects operating parameter settings as part of an optimization operation.

Operations 350 may begin with each base station obtaining initialized operating parameter settings of other base stations in the cluster (block 355). Each base station may receive the initialized operating parameter settings from the cluster controller or directly from the other base stations.

For an i-th base station (block 357), as determined according to a selected processing order specified by the cluster controller, for example, utility function results of the i-th base station may be determined according to possible operating parameter settings for the i-th base station, initialized operating parameter settings for the other base stations in the cluster, and initialized operating parameter settings for base stations outside of the cluster (block 359).

The selection of the operating parameter settings may be performed by selecting operating parameter settings that optimizes a summation of utility function results for the actual operating parameter settings of the i-th base station (block 361). As an example, an operating parameter setting that maximizes (or minimizes) the summation of utility function results corresponding to the operating parameter setting may be selected as the optimal operating parameter setting. It is noted that maximizing the summation or minimizing the summation may be examples of optimizing criterion.

The selected operating parameter settings may then be shared with other base stations in the cluster (block 363) and if there are more base stations in the cluster with operating parameter settings that have not been selected (block 365), operations 350 may return to block 357 to select another i-th base station. If the operating parameter settings have been selected for all of the base stations in the cluster, the selected operating parameter settings may be stored for subsequent use (block 367).

Since the operating parameters of each base station may change every transmission time slot to maximize communications system performance, each base station may be able to adaptively select data rates for its UE. Therefore, the transmit power information of surrounding base stations as well as pathloss from the UE to neighboring base stations may be exploited. The transmit power information may be shared among the base stations, while the pathloss can be derived from information, such as reference signal received power reports of neighboring base stations as reported by the UEs, uplink received signals at neighboring base stations, distance from base stations to UE, or a combination thereof.

In general, in a communications system, the UE may report its possible data rate by using channel quality indicator (CQI). When the UE reports its CQI, the base stations may record an interference amount $I_i$ from other base stations to the UE, based on instantaneous transmit power of neighboring base stations and the pathloss of the UE. When the base station calculates possible data rate of UEs for scheduling purposes, an interference amount I2 from other base stations is calculated again, according to current knowledge of the transmit power as well as beamforming of neighboring base stations. A difference of the interference $\Delta_I = I_2 - I_1$ may be used to adjust the actual data rates of the UEs. As an example, the data rate may be increased proportionally if $\Delta_I > 0$, and vice versa.

Typically, if the interference at the time of transmission is different from the interference at the time of the CQI report from the UE, the transmission rank may be adjusted accordingly. As an example, if the interference has decreased, then the transmission rank may be increased to obtain a greater data rate.

The selection of the settings of the operating parameters may be applied in any combination of RBGs in a single TTI. As an example, there may be applied on a per RBG basis or a per TTI basis. Application of an operating parameter setting on a per RBG basis means that the operating parameter of a single RBG may be optimized independently from other RBGs. As an example, considering a situation wherein transmit power is the operating parameter, then the transmit power setting per TTI may impose another constraint, namely the utility of all RBGs, expressible as $$\sum_{i=0}^{num_{BS}} \sum_{k=1}^{num_{RBG}} U_i(P_j, RBG_k),$$

in one TTI is maximized. The transmit power setting per TTI means that the power levels over all RBGs within one TTI is the same. Therefore, the performance of per TTI applications may be worse than per RBG applications.

Figures 4A, 4B:
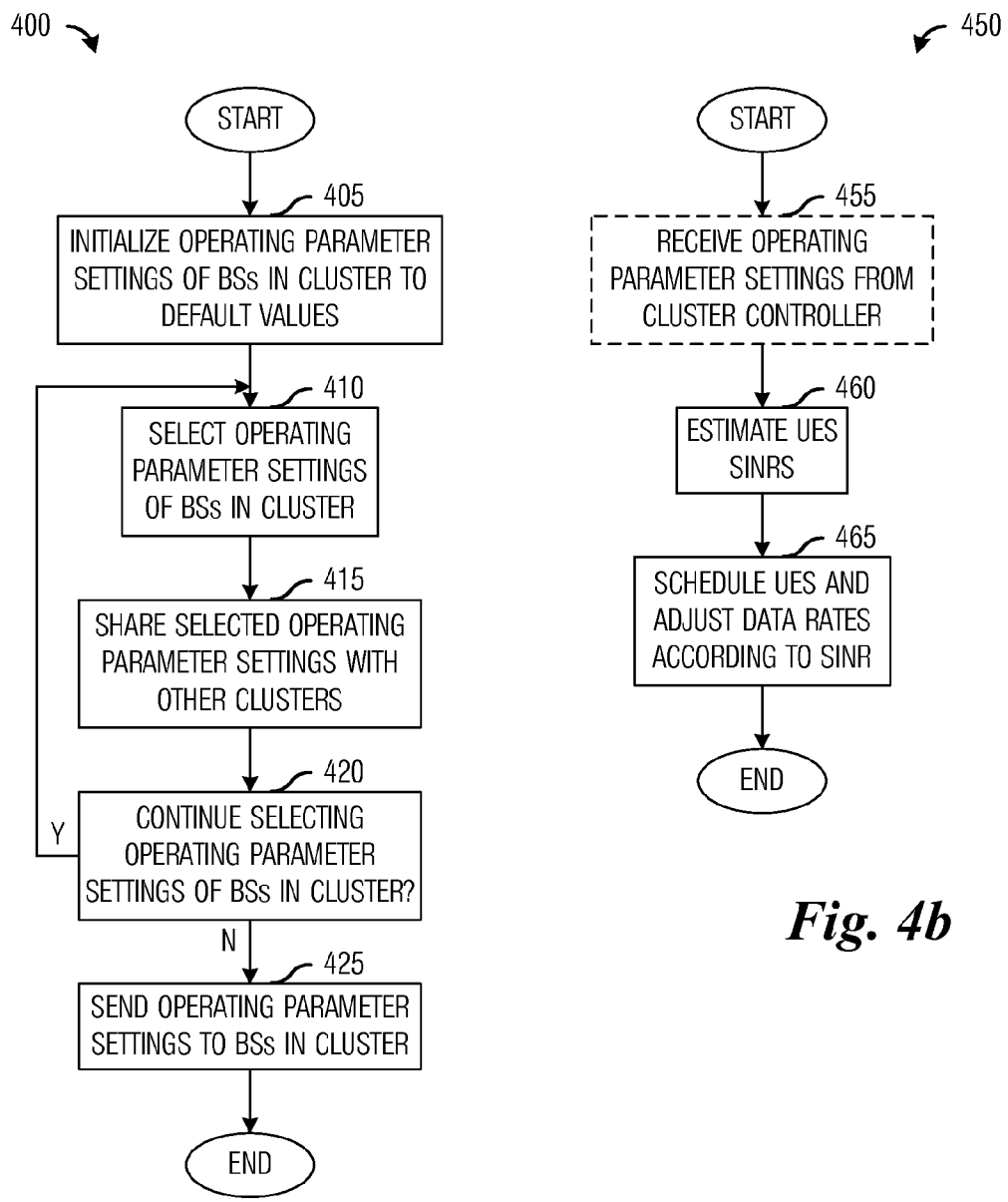
FIG. 4a illustrates an example flow diagram of operations occurring in a cluster controller as it participates in determining operating parameter settings according to example embodiments described herein.
FIG. 4b illustrates an example flow diagram of operations occurring in a base station as it schedules transmissions for its UEs according to example embodiments described herein.

FIG. 4a illustrates a flow diagram of operations 400 occurring in a cluster controller as it participates in determining operating parameter settings as part of an optimization process. Operations 400 may be indicative of operations occurring in a cluster controller, such as cluster controller 215 and cluster controller 230, as the cluster controller participates in determining operating parameter settings for base stations of a communications system.

The communications system may be partitioned in a plurality of non-overlapping clusters of base stations, which means that each base station in the communications system belongs to a single cluster. For discussion purposes, let $F_i(p_{i,k}, U_{i,m})$ be the utility function for the i-th base station, where $i=\{1, 2, \ldots, N\}$ and N is the number of base stations in a non-overlapping cluster for a RBG. According to the first example embodiment, the utility functions are formulated so that the settings of the operating parameters may be determined by maximizing a summation of all utility functions of base stations within a single cluster. Alternatively, the utility functions are formulated so that the settings of the operating parameters may be determined by minimizing a summation of all utility functions of base stations within a single cluster. It is noted that maximizing the summation or minimizing the summation may be examples of optimizing criterion. However, the formulation of the utility functions may also apply to other example embodiments discussed herein.

Operations 400 may begin with the cluster controller initializing the operating parameters of base stations in the cluster to initial settings (block 405). As discussed previously, operating parameters may include transmit power level, precoder, modulation and coding scheme of transmissions, location of reference signals (e.g., channel state information reference signals), pilot signal boosting level, frequency selective scheduling or frequency diversity scheduling, handover parameter (e.g., range extension, utility values, and the like), antenna tilt, antenna pattern, transmission rank, and the like. As an example, if the operating parameter is the transmit power level, then the initial setting of the operating parameter may be full transmit power or a fraction of full transmit power, such as half, quarter, and the like. According to the first example embodiment, on an initial determining of operating parameter settings for a first transmission period for the base stations, the cluster controller initializes the operating parameters of the base stations to initial settings that may be prespecified by an operator of the communications system, a technical standard to which the communications system follows, historical information regarding the operating parameters, and the like. Although, the cluster controller initializing the operating parameters of the base stations to initial settings that may be prespecified by an operator of the communications system, a technical standard to which the communications system follows, historical information regarding the operating parameters, and the like, may also apply to other example embodiments discussed herein. However, on subsequent determinations of the operating parameter settings, the cluster controller may utilize operating parameters settings determined for an earlier transmission period, such as a transmission period immediately preceding a current transmission period, an averaging (or some other function, such as weighted average, weighted sum, and the like) of the operating parameter settings determined for the earlier transmission period(s), and the like.

The cluster control may select the operating parameter settings of the base stations in the cluster (block 410). As an example, the selection of the operating parameter settings for base stations occurs on a resource block group (RBG) basis and once the operating parameter settings are selected for a particular RBG, unused portions of some operating parameters, such as transmit power level, may be used by other base stations with RBGs that utilize all of the corresponding operating parameters to obtain additional performance improvement. As an example, if the operating parameter is transmit power level and in one RBG for a particular base station, the selected transmit power level is not a full transmit power level, then other base stations with the selected transmit power level at the full transmit power level may exploit the unused transmit power level in the one RBG to obtain additional performance gain. As another example, if one RBG uses only a fraction of full transmit power level, the unused energy of the one RBG may be used for other RBG(s) to further boost performance, for example, of cell edge UEs, given a constraint on the total transmit power, which may be on a per transmit antenna basis or a per base station transmit antenna pool basis.

According to the first example embodiment, the selection of the operating parameter settings of the base stations may be according to possible settings of the operating parameters of the base stations, the initialized settings of the operating parameters of the base stations in the cluster, and initialized settings of the operating parameters of the base stations that are not in the cluster. The use of the initialized settings of the operating parameters of the base stations that are not in the cluster helps to simplify the selection of the operating parameter settings of base stations in the cluster by significantly reducing a computational space of computations that are made. The reduced computational space of computations helps to reduce the computational load on a network entity (such as the cluster controller, a base station, a dedicated entity in the communications system that performs the computations used in selecting the operating parameter settings of the base stations, and the like) performing the selection, and hence the optimization. However, the selection of the operating parameter settings of the base stations may be according to possible settings of the operating parameters of the base stations, the initialized settings of the operating parameters of the base stations in the cluster, and initialized settings of the operating parameters of the base stations that are not in the cluster may also apply to other example embodiments discussed herein.

Additionally, the partitioning of the communications system into the plurality of non-overlapping clusters further helps to reduce the computational space of computations by reducing a number of base stations in a single cluster. A trade-off may be made in a number of base stations in a cluster and a number of clusters in the plurality of non-overlapping clusters versus a number of cluster controllers and computational complexity involved in selecting the operating parameter settings of base stations in the clusters. Generally, if there are relatively few clusters, then the number of cluster controllers is smaller, thereby reducing implementation costs. However, with fewer clusters, each cluster may have more base stations, hence, individual cluster controllers, base stations, dedicated entities, and the like, may have greater computational load. Conversely, if there are many clusters, then the implementation costs may be greater due to the larger number of cluster controllers, however, individual cluster controllers, base stations, dedicated entities, and the like, may have lesser computational load. It is noted that with appropriate signaling, a cluster controller may be a base station within a respective cluster, in which the base station will decide upon its operating parameter settings while neglecting the selections of the operating parameter settings made in the other cells and/or base stations within it's cluster (i.e., assuming that the selections of the operating parameter settings made are the default and/or previously selected selections).

According to the first example embodiment, the selection of the operating parameter settings for the base stations in the cluster may be made according to a selected processing order for the base stations in the cluster. The selected processing order may, in general, specify a sequential processing order for the base stations in the cluster. Since the optimization problem may be a non-convex problem, the selected processing order may make an impact on the performance. One way to help alleviate the problem is to have several iterations of optimization with different selected processing orders. As an example, if there are four base stations in a cluster, then an example selected processing order may be base station 1, base station 3, base station 4, and base station 2. The selected processing order may be selected by the cluster controller, predetermined by an operator of the communications system, specified in a technical standard, and the like. As an example, the selected processing order may be made according to factors such as base station type, distance from cluster controller, bandwidth of a connection with the cluster controller, a number of UE supported by the base stations, priority of UE supported by the base stations, and the like. However, the selection of the operating parameter settings according to the selected processing order may also apply to other example embodiments discussed herein.

For a first base station in the selected processing order, the settings of the operating parameters may be selected using initialized settings for the operating parameters of other base stations in the cluster and initialized settings for base stations that are not in the cluster. Once the settings of the operating parameters for the first base station is selected, the selected operating parameter settings for the first base station may then be used in the selection of operating parameter settings for remaining base stations in the cluster, replacing the initialized settings of the operating parameters of the first base station. The selection of the operating parameter settings for the base stations in the cluster may continue until the operating parameter settings of the remaining base stations in the cluster have been selected, thereby completing the optimization process. A detailed description of the selection of the operating parameter settings is provided below. According to the first example embodiment, to reduce complexity and to allow different base stations to perform their operations in parallel, the operating parameter settings of the first base station may not be passed to other base stations before they themselves have selected their own operating parameter settings. However, the operating parameter settings of the first base station not being passed to other base stations before they themselves have selected their own operating parameter settings may also apply to other example embodiments discussed herein.

According to the first example embodiment, the selected processing order for a cluster may remain the same each time that the operating parameter settings for the base stations in the cluster are selected. Alternatively, the selected processing order for a cluster may be changed each time that the operating parameter settings for the base stations in the cluster are selected. Alternatively, the selected processing order for a cluster is selected at random. Alternatively, the selected processing order of a cluster is selected at random each time that the operating parameter settings for the base stations in the cluster are selected. However, the selected processing order changing or remaining the same that the operating parameter settings are selected may also apply to other example embodiments discussed herein.

According to the first example embodiment, when selecting operating parameter settings, it may be possible that the selected operating parameter settings be different from earlier operating parameter settings. Therefore, it may be possible to add an additional constraint that imposes a penalty (e.g., a reduction in a utility function result) if the selected operating parameter settings are different from the earlier operating parameter settings. Additionally, the penalty may be scaled depending on the difference between the selected operating parameter settings and the earlier operating parameter settings. However, the addition of the additional constraint to impose the penalty may also apply to other example embodiments discussed herein.

Additionally, the operating parameter settings are shared with UEs as well as other base stations, therefore, signaling overhead may be incurred in sharing the selected operating parameter settings with the UEs as well as the other base stations. As an example, in a 3GPP LTE compliant communications system, the signaling overhead may be realized in the signaling of user specific reference signals (commonly referred to as demodulation reference signals (DMRS)), which occupy network resources when signaled. Another constraint may be imposed to reflect the signaling overhead related to sharing the selected operating parameter settings with the UEs and the other base stations.

As discussed previously, the selection of the operating parameter settings of the base stations in the cluster may be performed using a distributed technique or a centralized technique. In the distributed technique, the base stations may be responsible for performing the computations used in the selection of the operating parameter settings. Once the settings of the operating parameters are selected, the base stations share (exchange) the selected operating parameter settings and continue until the settings of the operating parameters for the base stations in the cluster are selected. In the centralized technique, the cluster controller or the dedicated entity performs the computations used in the selection of the operating parameter settings. Once the settings of the operating parameters of the base stations in the cluster are selected, the operating parameter settings may be distributed to the base stations in the cluster.

With the operating parameter settings selected, the cluster controller may share the operating parameter settings for the base stations in the cluster with other clusters (block 415). According to the first example embodiment, the operating parameter settings may be shared with all of the other clusters in the communications system. Alternatively, the operating parameter settings may be shared with clusters that are within a specified distance from the cluster, i.e., neighboring clusters. However, the sharing of the operating parameter settings may also apply to other example embodiments discussed herein.

According to the first example embodiment, the operating parameter settings may be used to update the initialized settings of the operating parameters used by the other clusters when they are selecting operating parameter settings. However, the updating of the initialized settings of the operating parameters to be used by the other clusters may also apply to other example embodiments discussed herein.

The cluster controller may then perform a check to determine whether or not it will continue selecting the operating parameter settings of the base stations in the cluster (block 420). With the newly selected operating parameter settings received from other clusters, it may be possible that the initialized settings of the operating parameters for base stations that are not in the cluster to change. Therefore, the operating parameter settings of the base station in the cluster may also change. Therefore, if there are sufficient computational resources, time, and the like, for example, the cluster controller may re-select at least some of the operating parameter settings of the base stations in the cluster. Furthermore, the cluster controller may decide to re-select at least some of the operating parameter settings of the base stations in the cluster, but it may decide to delay the re-selection until a later time when more computational resources, time, and the like, are available. If the cluster controller re-selects at least some of the operating parameter settings (i.e., block 410), the cluster controller may share the re-selected operating parameter settings to the other clusters (i.e., 415). The cluster controller may also repeat block 420 to determine if it will continue selecting the operating parameter settings of the base stations in the cluster. In other words, the selecting of the operating parameter settings and the sharing of the selected operating parameter settings may be repeated a number of times. The cluster controller may send the operating parameter settings to the base stations in the cluster (block 425).

According to the first example embodiment, once the operating parameter settings have been selected, the cluster controller may further change serving base station (or similarly, serving cell) assignments of some UEs to help improve the overall performance of the communications system. As an example, a UE that is being served by a macro BS may be reassigned to a pico BS by the cluster controller to help improve overall communications system performance. The reassignment of UEs from macro BS to pico BS may help to increase overall gains. However, the changing of the serving base station may also apply to other example embodiments discussed herein.

According to the example embodiment, in addition to reassigning serving base stations and cells, it may be possible to use multiple point operation, such as cooperative multiple point (CoMP) operation with multiple base stations and/or multiple UEs to transmit to a single receiver or multiple receivers to implement a large resource element. As an example, multiple base stations and/or cells may transmit parts of a single transmission to a single UE. As another example, multiple UEs may feedback information to a single base station or cell. However, the use of CoMP operation may also apply to other example embodiments discussed herein.

As discussed previously, the selection of the operating parameter settings for base stations in clusters may occur in parallel or sequentially. When the selection of the operating parameter settings occurs in parallel, the selection of the operating parameter settings for the base stations of each cluster may occur at the same time or substantially at the same time. As an example, in a communications system with three clusters, the cluster controller for each of the three clusters may select the operating parameter settings for its base stations simultaneously with the other cluster controllers. While, when the selection of the operating parameter settings occurs sequentially, the selection of the operating parameter settings for the base stations of each cluster may occur one at a time, potentially according to a preferred ordering. With the sequential selection of the operating parameter settings, the selected operating parameter settings from a cluster may be shared with other clusters prior to the cluster controllers in the other clusters selecting the operating parameter settings for their base stations.

Figure 2B:
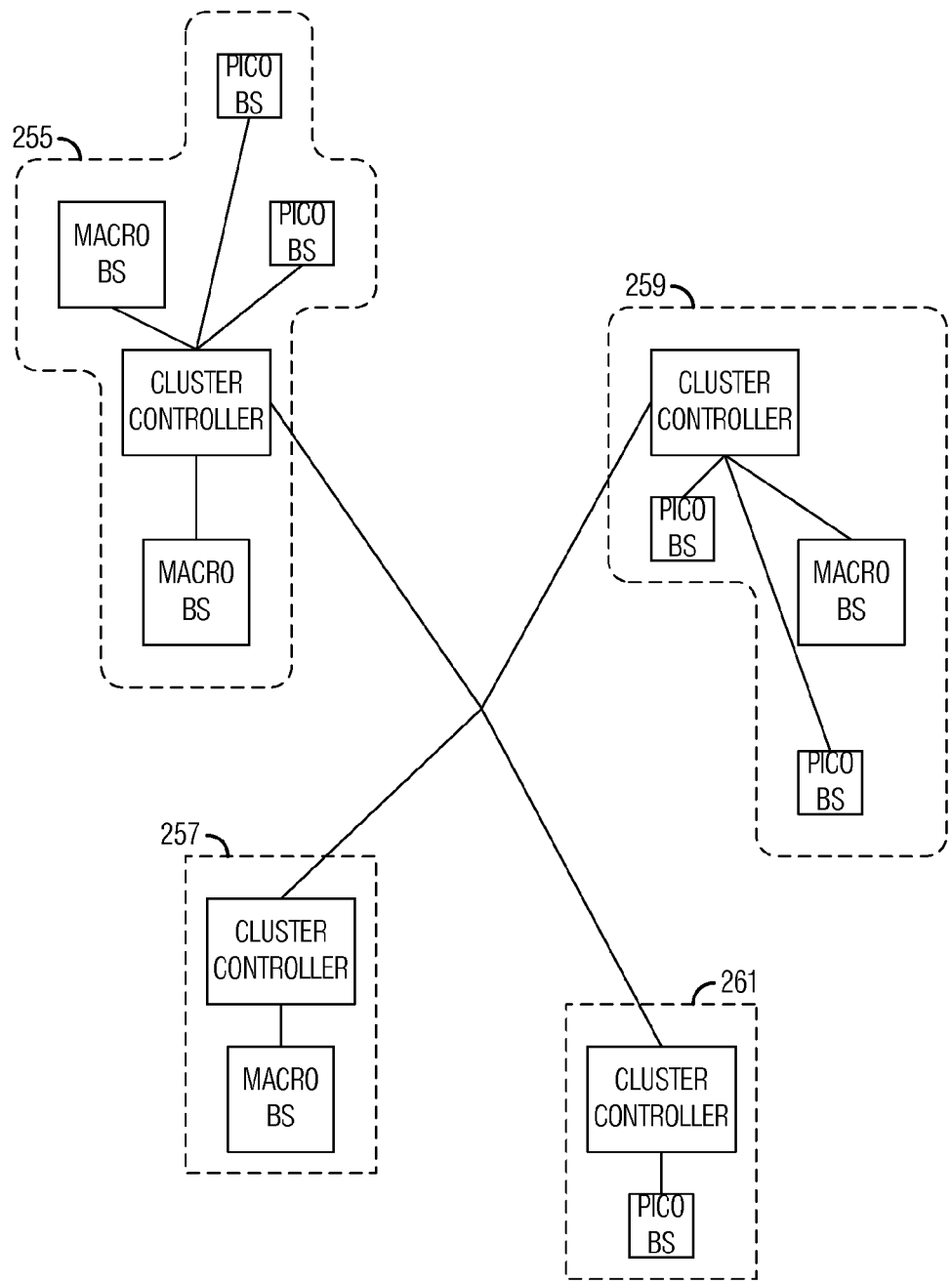
FIG. 2b illustrates an example communications system, wherein communications system is partitioned into a plurality of non-overlapping clusters according to example embodiments described herein.

FIG. 4b illustrates a flow diagram of operations 450 occurring in a base station as it schedules transmissions for its UEs. Operations 450 may be indicative of operations occurring in a base station, such as macro BS 220, macro BS 222, pico BS 224, pico BS 226, macro BS 232, and the like, of FIG. 2, as the base station schedules transmissions for its UEs. It is noted that scheduling transmissions includes allocating network resources to be used in transmitting to the UEs, as well as selecting other parameters, such as data rate, modulating and coding scheme, and the like.

Operations 450 may begin with the base station optionally receiving the operating parameter settings from a cluster controller (block 455). Operations 450 generally occur after the selection of operating parameter settings. According to the first example embodiment, if the selection of the operating parameter settings is performed in a centralized manner, as an example, at the cluster controller, a dedicated entity, and the like, the base station may receive the operating parameter settings for itself and other base stations in the cluster from the cluster controller, the dedicated entity, and the like. According to the second example embodiment, if the selection of the operating parameter settings is performed in a distributed manner, i.e., the base station participates in the selection of the operating parameter settings, then the base station already has the operating parameter settings for itself and other base stations in the cluster and does not need to receive the operating parameter settings from the cluster controller, the dedicated entity, and the like.

The base station may estimate a metric for each of its UEs (block 460). According to the first example embodiment, the metric estimated by the base station may include a signal to interference plus noise ratio (SINR), a signal to noise ratio (SNR), and the like. However, the estimating of the metric may also apply to other example embodiments discussed herein. The base station may estimate the metric using the operating parameter settings for itself and other base stations in the cluster, the operating parameter settings for base stations not in the cluster, pathloss values for channels between the UEs and other base stations in the cluster, feedback information provided by the UE (including reference signal received power (RSRP) measurements, channel quality indicator (CQI), rank indicator, precoder index, and the like). It is noted that the base station may override some of the feedback information provided by the UE according to channel condition.

As an example, the base station may estimate the pathloss of a channel between itself and the UE from the RSRP measurements provided by the UE. Furthermore, the base station may be able to estimate the interference level. The measurements used by the UE for the feedback information are directed by the base station, so the base station knows which resources are used by the UE for measurements. Furthermore, the base station may also use CQI feedback from the UEs and transmit power levels from other base stations, UE location information, neighbor list information from the UEs, uplink pathloss information from other base stations, explicit feedback from the UEs, or a combination thereof, to help improve metric estimation.

Additionally, the base station (possibly along with other base stations in the cluster) may estimate a gain to base stations outside of the cluster and adjust the operating parameter settings accordingly. In a situation where the pathloss from the UE to base stations outside of the cluster is not available, the base station may place more weight on lower operating parameter settings to estimate the gain of base stations outside of the cluster. Also, the base station may receive information from the base stations outside of the cluster to help in the estimation of gains and/or pathlosses. Additionally, default or expected values for gains and/or pathlosses may be provided to other base stations to allow for better estimations in the event of lack of actual values.

The base station may schedule UEs for transmission according to the estimated metric (block 465). According to the first example embodiment, the base station selects UEs from its UEs according to the estimated metric. As an example, the base station may select UEs with high SINR values over UEs with low SINR values. However, the selecting of the UEs according to the estimated metric may also apply to other example embodiments discussed herein.

According to an example embodiment, the base station may also use other selection criterion to select the UEs. However, the use of other selection criterion may also apply to other example embodiments discussed herein. Other selection criterion may include UE priority, available network resources, UE service history, amount of information to transmit to a UE, and the like.

In addition to scheduling UEs, the base station may adjust a data rate for the scheduled UEs according to the estimated metric. As an example, the base station may reduce the data rate for a first scheduled UE if its estimated metric (e.g., SINR) is low, while the base station may increase the data rate for a second scheduled UE if its estimated metric is high.

According to the first example embodiment, modulation and coding scheme (MCS) adaptation may be utilized to adjust the data rate of the scheduled UEs. There may be several different MCS adaptation processes. However, the MCS adaptation to adjust the date rate of the scheduled UEs may also apply to other example embodiments discussed herein.

A first MCS adaptation process may involve MCS adaptation during the scheduling of the UEs for calculating an instantaneous data rate of UEs in each RBG. When a UE sends feedback information, e.g., channel state information (CSI) at an n-th transmission time interval (TTI), the base stations determine an interference at the n-th TTI, $I_{TTI=n}$, where the interference may be determined according to long term pathloss information (measured by RSRP in the downlink or sounding reference signal (SRS) in the uplink, for example). The interference at the n-th TTI is expressible as $$I_{TTI=n} = \sum_{i=1}^{L} P_{i,TTI=n} \times \beta_i,$$

where $\beta_i$ is the pathloss between a UE and neighboring base station BSi, L is the number of neighboring base stations, and $P_{i,TTI=n}$ is the operating parameter setting (e.g., transmit power level) of BSi at the n-th TTI. It is noted that the use of averaging for interference is not precluded in which $P_{i,TTI=n}$ is replaced by a function of the previous operating parameters. As an example, the function may be a sliding window over the TTI for which the UE is to perform interference measurements.

When determining the instantaneous data rate of the UE at a (n+k)-th TTI, the base station may recalculate the interference at the (n+k)-th TTI, which is expressible as $$I_{TTI=n+k} = \sum_{i=1}^{L} P_{i,TTI=n+k} \times \beta_i.$$

Then, from the feedback information, e.g., CQI, in terms of the MCS level, the base station may convert the MCS level into a SINR value at the n-th TTI, $SINR_{TTI=n}$, to account for short term fading. An adjusted SINR at the (n+k)-th TTI may then be determined as $$SINR_{TTI=n+k} = SINR_{TTI=n} \times \frac{I_{TTI=n}}{I_{TTI=n+k}}.$$

From the adjusted SINR, the MCS level (and hence the instantaneous data rate) may be chosen for the UE. The adjusted SINR may be improved if the base station knows the UE's channel matrix rather than the quantized CQI feedback. With the knowledge of the channel matrix, the base station may be able to change the transmission rank, the precoder, as well as SINR per layer.

A second MCS adaptation process may involve MCS adaptation after the selection of the operating parameter settings is completed and the operating parameter settings are shared among the base stations. The second MCS adaptation process may be used to determine a final data rate of the scheduled UEs. The second MCS adaptation process may be performed as follows:

The interference to each UE may be adjusted based on an updated operating parameter setting of neighboring base stations;

The base stations may determine the utility function results of each UE and assign RBG(s) to UEs having the largest utility function result; and If a UE is assigned multiple RBGs, an average SINR may be calculated across the multiple RBGs. A single MCS level is chosen for the UE for all of its assigned RBGs. Also, different MCS levels could be assigned for different RBG.

According to the first example embodiment, the base station may average UE reported feedback information (e.g., SINR, CQI, and the like) for the purpose of data rate (MCS) adjustment. However, the averaging of UE reported feedback information may also apply to other example embodiments discussed herein. As an example, instead of a most recently reported feedback information (e.g., SINR, CQI, and the like), the base station may average the feedback information reported within a time window. Alternatively, the base station may use long term SINR derived from RSRP reports for data rate (MCS) adjustment.

According to the first example embodiment, when the base station has no data to transmit, e.g., in a subframe, then the base station may transmit a totally blank data subframe to minimize interference. However, the transmitting of the totally blank data subframe may also apply to other example embodiments discussed herein. As an example, in a 3GPP LTE compliant communications system, the base station may transmit a multicast-broadcast single frequency network (MBSFN) subframe. It is noted that although the totally blank data subframe may not include any data (or in some instances, very small amounts of data), the totally blank data subframe may include control information.

According to the first example embodiment, in a situation wherein the base station is retransmitting a message due to a transmission failure, the base station may utilize its current operating parameter settings to retransmit the message rather than using the operating parameter settings used to originally transmit the message. However, the use of current operating parameter settings to retransmit may also apply to other example embodiments discussed herein.

Figure 5A:
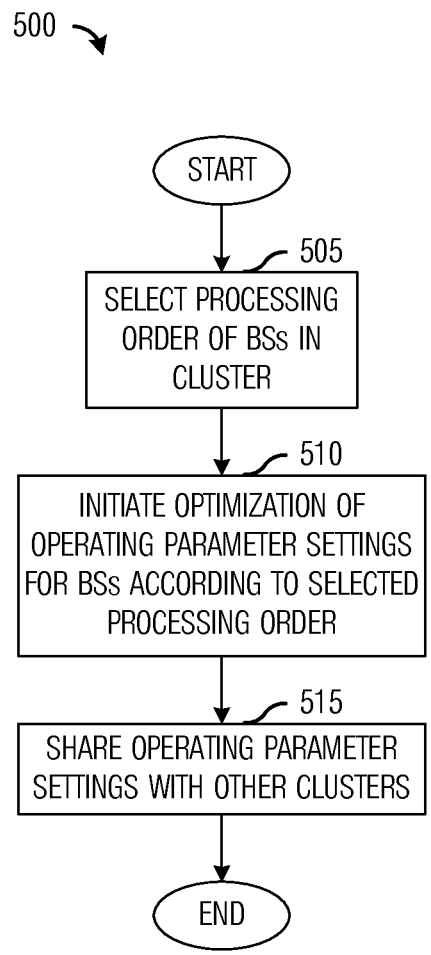
FIG. 5a illustrates an example flow diagram of operations occurring in a cluster controller as it participates in a distributed version of operating parameter setting selection according to example embodiments described herein.

FIG. 5a illustrates a flow diagram of operations 500 occurring in a cluster controller as it participates in a distributed version of operating parameter settings selection. Operations 500 may be indicative of operations occurring in a cluster controller, such as cluster controller 215 and cluster controller 230, as the cluster controller participates in selecting operating parameter settings for base stations of a communications system in a distributed fashion.

Operations 500 may begin with the cluster controller selecting a processing order for the base stations in the cluster (block 505). According to the second example embodiment, the processing order may be selected by the cluster controller, predetermined by an operator of the communications system, specified in a technical standard, and the like. However, the selecting of the processing order may also apply to other example embodiments discussed herein. As an example, the processing order may be made according to factors such as base station type, distance from cluster controller, bandwidth of a connection with the cluster controller, a number of UE supported by the base stations, priority of UE supported by the base stations, and the like.

According to the second example embodiment, the processing order may be used to exclude or include certain types of base stations or specific base stations. However, the use of the processing order to exclude or include certain base stations may also apply to other example embodiments discussed herein. As an example, the processing order may be used to exclude pico base stations from the selection of operating parameter settings by simply not listing the pico base stations in the processing order. Similarly, specific base stations may be excluded by simply not listing the specific base stations in the processing order. Although the pico base stations are considered to be part of a cluster and they may be considered in the selection of operating parameter settings for macro base station, pico base stations are generally low power devices and it may be desirable to not select operating parameter settings for pico base stations to reduce computational complexity in the selecting of operating parameter settings for other base stations, such as macro base stations.

The cluster controller may initiate an optimization of the operating parameter settings of the base stations in the cluster according to the selected processing order (block 510). As an example, if the selected processing order may be base station 1, base station 3, base station 4, and base station 2 for a cluster with four base stations, then the cluster controller may initiate the selection of the operating parameter settings so that the operating parameter settings of base station 1 are selected first, followed by the selection of the operating parameter settings for base station 3, base station 4, and then base station 2. The cluster controller may share (exchange) the operating parameter settings with other clusters (block 515). According to the second example embodiment, the operating parameter settings may be shared with all of the other clusters in the communications system. However, the sharing of the operating parameter settings may also apply to other example embodiments discussed herein. Alternatively, the operating parameter settings may be shared with clusters that are within a specified distance from the cluster, i.e., neighboring clusters.

Generally, the operating parameter settings of a base station in a cluster may differ for different TTIs. Therefore, the selection of the operating parameter settings may be performed for each TTI. However, the selection of the operating parameter settings for each TTI may require a significant amount of computational resources, which may not be available or may be used elsewhere.

According to the second example embodiment, semi-static operational parameter setting selection may be used to reduce the number of times that the selection of the operating parameter settings is performed, thereby reducing computational requirements. However, the semi-static operating parameter setting selection may also apply to other example embodiments discussed herein. As an example, the operating parameter settings from a previous TTI may be used for a current TTI rather than selecting new operating parameter settings. Additionally, historical information may be used to select which operating parameter settings to be used for the TTI. As an example, historical information may be used to select operational parameter settings most often used in corresponding TTIs.

According to the second example embodiment, sample and hold operating parameter settings may be used to reduce the number of times that the selection of the operating parameter settings is performed, thereby reducing computational requirements. However, the sample and hold operating parameter settings may also apply to other example embodiments discussed herein. As an example, the operating parameter settings may be selected for a TTI and then used for a plurality of subsequent TTIs. A number of TTIs in the plurality of subsequent TTIs may be a pre-configured value, may be dependent on operating conditions of the communications system, UE mobility, and the like.

According to an example embodiment, delayed operating parameter settings may be used to reduce the number of times that the selection of the operating parameter settings is performed, thereby reducing computational requirements, as well as allowing for communication and/or processing delays in selecting the operating parameter settings. However, the delayed operating parameter settings may also apply to other example embodiments discussed herein. As an example, the operating parameter settings may be selected for a k-th TTI, but not applied until a (k+C)-th TTI, where C is a constant representing UE scheduling periodicity. By selecting the operating parameter settings before they are actually needed, computational restraints according to real-time requirements may be relaxed.

Figures 5B, 5C:
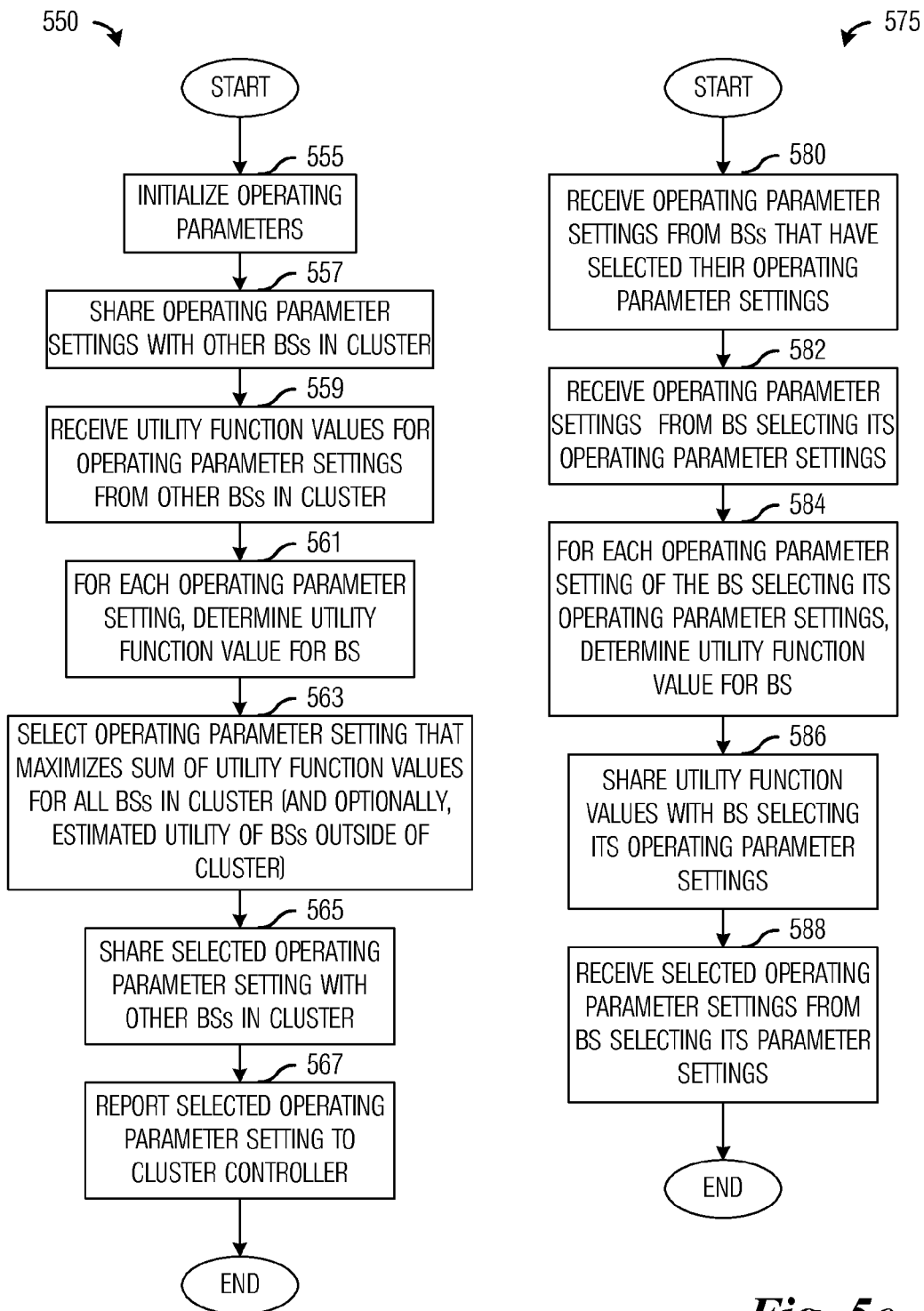
FIG. 5b illustrates an example flow diagram of operations occurring in a base station as it participates in a distributed version of operating parameter setting selection, wherein the base station is selecting its operating parameter settings according to example embodiments described herein.
FIG. 5c illustrates an example flow diagram of operations occurring in a base station as it participates in a distributed version of operating parameter selection, wherein the base station is assisting another base station select its operating parameter settings according to example embodiments described herein.

FIG. 5b illustrates a flow diagram of operations 550 occurring in a base station as it participates in a distributed version of operating parameter setting selection, wherein the base station is selecting its operating parameter settings. Operations 550 may be indicative of operations occurring in a base station, such as macro BS 220, macro BS 222, pico BS 224, pico BS 226, macro BS 232, and the like, of FIG. 2, as the base station participates in selecting operating parameter settings for base stations of a communications system in a distributed fashion.

Operations 550 may begin with the base station initializing its operating parameter settings (block 555). According to the second example embodiment, initializing the operating parameter settings may include the base station determining possible settings for the operating parameters. However, the base station determining possible settings may also apply to other example embodiments discussed herein. As an example, if the operating parameter is a transmit power level, then initializing the operating parameter setting includes determining a set of possible transmit power levels for the base station. While, if the operating parameter is a precoder, then initializing the operating parameter setting includes determining a set of possible precoders that the base station may use, or conversely a set of null precoders which the base station may not use (i.e., an indication of where interference will not be generated)

The base station may share (exchange) the operating parameter settings, i.e., the possible settings of the operating parameters, to other base stations in the cluster (block 557). The base station may receive utility function results from the other base stations in the cluster (block 559). According to the second example embodiment, the other base stations in the cluster determine their utility function results according to the operating parameter settings shared by the base station, as well as initialized settings of the operating parameter from base stations not in the cluster. However, the base stations determining their utility function results according to the operating parameter settings as well as initialized settings of base stations not in the cluster may also apply to other example embodiments discussed herein.

As an example, considering a situation with a cluster having two base stations (a first base station (BS1) and a second base station (BS2)) with two other clusters in the communications system, with the first base station selecting its operating parameter settings. Furthermore, if the operating parameter is a transmit power level and for the first base station in the cluster, there are two possible settings for the transmit power level (TPL1_1, and TPL1_2) and for the second base station in the cluster, there are three possible settings for the transmit power level (TPL2_1, TPL2_2, and TPL_2_3). Then, the first base station shares its transmit power levels (TPL1_1, and TPL1_2) with the second base station and receives utility function results from the second base station. As an example, the second base station may determine its utility function results as follows:

Utility(BS2, TPL1_1)=Utility_Function_BS2(TPL1_1, initialized_BS2, initialized_outsidecluster_1, initialized_outsidecluster_2); and Utility(BS2, TPL1_2)=Utility_Function_BS2(TPL1_2, initialized_BS2, initialized_outsidecluster_1, initialized_outsidecluster_2), where Utility(BS2,X) represents the utility function result from the second base station for operating parameter setting X, initialized_BS2 is an initialized setting of the operating parameter for the second base station, initialized_outsidecluster_1 is an initialized setting of the operating parameter for a first other cluster, and initialized_outsidecluster_2 is an initialized setting of the operating parameter for a second other cluster.

The base station may determine its own utility function result for its possible operating parameter settings (block 561). According to the second example embodiment, the base station determines its own utility function results for its possible operating parameter settings and initialized settings (or previously selected operating parameter settings) of other base stations in the cluster and initialized settings (or previously selected operating parameter settings) of base stations in other clusters. However, the base station determining its own utility function results for its possible operating parameter settings and initialized settings of other base stations also apply to other example embodiments discussed herein.

As an example, revisiting the above situation with the cluster having two base stations, and neither base station having selected its operating parameters. Then the first base station may determine its utility function results as:

Utility(BS1, TPL1_1)=Utility_Function_BS1(TPL1_1, initialized_BS2, initialized_outsidecluster_1, initialized_outsidecluster_2); and Utility(BS1, TPL1_2)=Utility_Function_BS1(TPL1_2, initialized_BS2, initialized_outsidecluster_1, initialized_outsidecluster_2).

As another example, considering a situation wherein the first base station has already determined its operating parameter settings, and the second base station is selecting its operating parameter settings, then the first base station may provide to the second base station its utility function results expressible as (with an assumption that the first base station has selected TPL1_2 as its operating parameter, for example)

Utility(BS1, TPL2_1)=Utility_Function_BS1(TPL1_2, TPL2_1, initialized_outsidecluster_1, initialized_outsidecluster_2);

Utility(BS1, TPL2_2)=Utility_Function_BS1(TPL1_2, TPL2_2, initialized_outsidecluster_1, initialized_outsidecluster_2); and Utility(BS1, TPL2_3)=Utility_Function_BS1(TPL1_2, TPL2_3, initialized_outsidecluster_1, initialized_outsidecluster_2).

The second base station may determine its own utility function results as follows Utility(BS2,TPL2_1)=Utility_Function_BS2(TPL1_2, TPL2_1, initialized_outsidecluster_1, initialized_outsidecluster_2);

Utility(BS2,TPL2_2)=Utility_Function_BS2(TPL1_2, TPL2_2, initialized_outsidecluster_1, initialized_outsidecluster_2); and Utility(BS2,TPL_3)=Utility_Function_BS2(TPL1_2, TPL2_3, initialized_outsidecluster_1, initialized_outsidecluster_2).

With its utility function results determined and having received utility function results from other base stations in the cluster, the base station may optimally select its operating parameter settings (block 563). According to an example embodiment, the base station may sum up utility function results associated with each possible operating parameter setting and select an operating parameter setting that results in the largest summed value. According to an alternative example embodiment, the base station may sum up utility function results associated with each possible operating parameter setting and select an operating parameter setting that results in the smallest summed value.

As an example, revisiting the above situation with the cluster having two base stations, the first base station may perform two summations (one for each of its two possible operating parameter settings):

Summation(TPL1_1)=Utility(BS2, TPL1_1)+Utility(BS1, TPL1_1); and

Summation(TPL1_2)=Utility(BS2, TPL1_2)+Utility(BS1, TPL1_2), where Summation(X) is the summation for operating parameter setting X.

As another example, revisiting the above situation, but with the first base station having already determined its operating parameters, the second base station may perform three summations (one for each of its three possible operating parameter settings):

Summation(TPL2_1)=Utility(BS1, TPL2_1)+Utility(BS2, TPL2_1);

Summation(TPL2_2)=Utility(BS1, TPL2_2)+Utility(BS2, TPL2_2); and

Summation(TPL2_3)=Utility(BS1, TPL2_3)+Utility(BS2, TPL2_3).

In the description of block 563 presented above, the base station considers its own utility function results along with utility function results from other base stations in the cluster in the selection of the operating parameter settings. However, it is also possible for the base station to also consider utility function results from base stations outside of the cluster in the selection of the operating parameter settings.

Generally, when selecting operating parameter settings for base stations of clusters in parallel, it may be difficult to calculate an impact of an operating parameter setting of a base station inside the cluster on utility function results of base stations outside of the cluster. However, it may be possible to estimate the impact on the utility function results of base stations outside of the cluster. The estimated impact on the utility function results of base stations outside of the cluster may then be considered when selecting the operating parameter settings of base stations inside the cluster.

As an example, consider a base station denoted $BS_k$, then the utility function for the communications system, given that the operating parameter setting of $BS_k$ is denoted $P_j$ (e.g., transmit power level), may be expressible as $$U(\text{whole system} | P(BS_k) = P_j) = U_{in}(P(BS_k) = P_j) + U_{out}(P(BS_k) = P_j)$$
$$= W(BS_k, P_j) \times U_{in}(P(BS_k) = P_j),$$

where $$U_{in}(P(BS_k) = P_j) = \sum_{i=1}^{\#of\ BS\ of\ cluster} U(BS_{i,in} | P(BS_k) = P_j),$$

$$U_{out}(P(BS_k) = P_j) = \sum_{i=1}^{\#of\ BS\ outside\ of\ cluster} U(BS_{i,out} | P(BS_k) = P_j),$$

and a utility function weight $W(BS_k, P_j)$ may be expressible as $$W(BS_k, P_j) = \frac{U_{in}(P(BS_k) = P_j) + U_{out}(P(BS_k) = P_j)}{U_{in}(P(BS_k) = P_j)}.$$

It is noted that $U_{in}(P(BS_k)=P_j)$ includes the utility function of $BS_k$.

In practice, when the selection of the operating parameter settings is performed in parallel, it may be difficult to determine the utility function results for base stations outside of the cluster. However, it may be possible to approximate the utility function weight $W(BS_k, P_j)$ from long term utility function results. As an example, considering a situation wherein information is transmitted from a base station $BS_i$ to a neighboring base station $BS_k$. For each RBG, the information may include: utility function results for scheduled UE(s); and a neighbor list of the scheduled UE(s). The neighbor list may provide information about which neighboring base station needs to update their utility function weights. Table 1 illustrates example neighbor lists for base station $BS_i$.

TABLE 1

Example Neighbor Lists.

| Utility RBG-1 | Utility RBG-2 | Utility RBG-3 |
|---|---|---|
| Neighbor list RBG-1 BS2, BS3, BS4 | Neighbor list RBG-2 BS3 | Neighbor list RBG-3 BS3, BS4 |

As shown in Table 1, base station BS2 only needs to update its utility function weight in RBG-1, while base station BS4 needs to update its utility function weight in RBG-1 and RBG-3, and base station BS3 needs to update its utility function weight in RBG-1, RBG-2, and RBG-3.

According to the second example embodiment, the utility function weight $W(BS_k, P_j)$ is calculated using a long term average of utility function results of base stations in the cluster and base stations outside the cluster, however, other mathematical functions may be used. However, the calculating of the utility function weight using the long term average may also apply to other example embodiments discussed herein. As an example, at every TTI (or at specified TTIs), the utility function results of base stations in the cluster and base stations outside the cluster may be updated whenever a corresponding base station is included in neighbor list information provided by an impacted base station. The updating of the utility function results may be expressed as $$U_{in,TTI=n}(P(BS_k) = P_j) = \gamma_{BS_{k,in}} U_{in,TTI=n-1}(P(BS_k) = P_j) + \sum_{i=1}^{\#of\ Neighbors} (BS_{i,in} | P(BS_k) = P_j, k \in \text{Neighbor list of } BS_i)$$

and $$U_{out,TTI=n}(P(BS_k) = P_j) = \gamma_{BS_{k,out}} U_{out,TTI=n-1}(P(BS_k) = P_j) + \sum_{i=1}^{\#of\ Neighbors} U(BS_{i,out} | P(BS_k) = P_j, k \in \text{Neighbor list of } BS_i),$$

where $\gamma_{BS_{k,in}}$ and $\gamma_{BS_{k,out}}$ are constants used in determining the weighting of an accumulated utility of the historic utility function results in newly accumulated utility function weights for base stations inside the cluster and base stations outside the cluster, respectively.

Additionally, applying utility weights for the selected operating parameter settings may be difficult if pathloss information from UEs to some base stations is not available. It might not be possible to estimate the interference from those base stations if their operating parameter settings have changed. It may be possible to apply different weights on the sum utility. More weight may be added to some settings to estimate the performance gain and/or loss of some base stations whose pathloss to the UE is unknown. It may also be possible to exchange throughput gain and/or loss among the base stations when a base station uses specific operating parameter settings, the surrounding base stations may estimate the performance difference compared to a situation when the base station uses default or initialized operating parameter settings. The estimated gain and/or loss may be used to determine the utility weights.

The base station may share the selected operating parameter settings with other base stations in the cluster (block 565). The base station may also report the selected operating parameter settings to the cluster controller (block 567).

FIG. 5c illustrates a flow diagram of operations 575 occurring in a base station as it participates in a distributed version of operating parameter setting selection, wherein the base station is assisting another base station select its operating parameter settings. Operations 575 may be indicative of operations occurring in a base station, such as macro BS 220, macro BS 222, pico BS 224, pico BS 226, macro BS 232, and the like, of FIG. 2, as the base station participates in selecting operating parameter settings for base stations of a communications system in a distributed fashion.

Operations 575 may begin with the base station receiving operating parameter settings from one or more base stations that have selected their operating parameter settings (block 580). As discussed previously, the base stations may select their operating parameter settings according to a selected processing order and a base station uses selected operating parameter settings when assisting other base stations in its selection of operating parameter settings. If there are one or more base stations in the cluster that have not selected their operating parameter settings, then initialized operating parameter settings associated with these base stations may be used.

The base station may receive possible operating parameter settings from the base station that is selecting its operating parameter settings (block 582). The base station may then determines its utility function results according to the possible operating parameter settings, selected operating parameter settings for base stations that have selected their operating parameter settings, initialized operating parameter settings for base stations in the cluster that have not selected their operating parameter settings, initialized settings for base stations not in the cluster, or combinations thereof.

As an example, considering a situation with a cluster having two base stations (a first base station (BS1) and a second base station (BS2)) with two other clusters in the communications system, with the second base station assisting the first base station in selecting its operating parameter settings. Furthermore, the operating parameter is a transmit power level and for the first base station in the cluster, there are two possible settings for the transmit power level (TPL1_1, and TPL1_2) and for the second base station in the cluster, there are three possible settings for the transmit power level (TPL2_1, TPL2_2, and TPL_2_3). The second base station may determine its utility function results as follows Utility(BS2, TPL1_1)=Utility_Function_BS2(TPL1_1, initialized_BS2, initialized_outsidecluster_1, initialized_outsidecluster_2); and Utility(BS2, TPL1_2)=Utility_Function_BS2(TPL1_2, initialized_BS2, initialized_outsidecluster_1, initialized_outsidecluster_2).

The base station may share its utility function results with the base station that is selecting its operating parameter settings (block 586) and then receive, from the base station that is selecting its operating parameter settings, the selected operating parameter settings (block 588).

Figure 6:
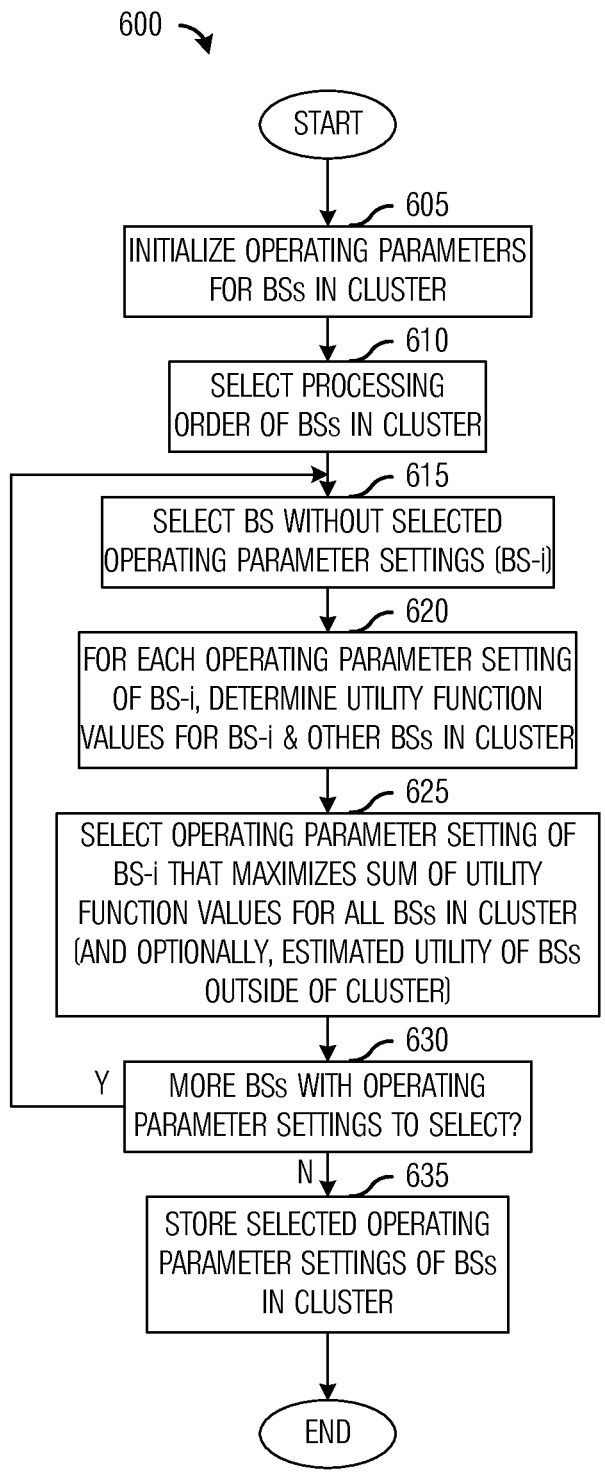
FIG. 6 illustrates an example flow diagram of operations occurring in a cluster controller as it participates in a centralized version of operating parameter selection according to example embodiments described herein.

FIG. 6 illustrates a flow diagram of operations 600 occurring in a cluster controller as it participates in a centralized version of operating parameter selection. Operations 600 may be indicative of operations occurring in a cluster controller, such as cluster controller 215 and cluster controller 230, as the cluster controller participates in selecting operating parameter settings for base stations of a communications system in a centralized fashion.

Operations 600 may begin with the cluster controller initializing operating parameter settings of base stations in its cluster (block 605). The cluster controller may also select a processing order for the base stations in its cluster (block 610).

The cluster controller may select a base station for operating parameter setting selection according to the selected processing order (block 615). For the selected base station, the cluster controller may determine utility function results for the selected base station as well as for other base stations in the cluster for the selected base station's operating parameter settings (block 620). According to the first example embodiment, for base stations that are in and out of the cluster that do not have selected operating parameter settings, the cluster controller may use initialized operating parameter settings. However, the use of initialized operating parameter settings for base stations that do not have selected operating parameter settings may also apply to other example embodiments discussed herein. To optimize the operating parameter settings, the cluster controller may select an operating parameter setting that maximizes (or minimizes), for example, summations of utility function results of the base stations in the cluster (block 625).

The cluster controller may then perform a check to determine if there are any additional base stations with operating parameter settings to select (block 630). If there are additional base stations, then the cluster controller may return to block 615 to repeat the operating parameter setting selection process with another base station. If there are no more base stations, then the cluster controller may store the selected operating parameter settings for subsequent use (block 635).

In a heterogeneous communications system with base stations of different capabilities, e.g., macro BS and pico BS, the macro BS may select settings for some operating parameters such as transmit power level, which may be lower than a nominal value to help UEs served by pico BS. To increase the gain of a UE served by a pico BS, it may be possible to increase the number of UEs served by the pico BS by applying a cell selection bias when searching for a serving base station or transmitting data using a pico BS while the UE receives control signaling from a macro BS.

Additionally, under certain circumstances, the transmit power level for some base stations may be zero. This may imply that interference from these base stations to UEs of other base stations is too great. In such a situation, the control signals and the pilot signals from these base stations may be switched off. As an example, the switching off of the control signals and the pilot signals may be achieved using MBSFN subframes in a 3GPP LTE compliant communications system.

Figure 7A:
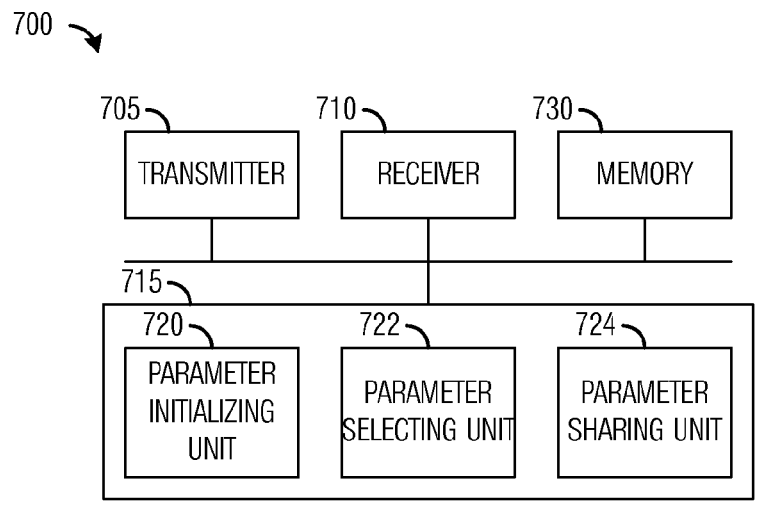
FIG. 7a illustrates an example first communications device according to example embodiments described herein.

FIG. 7a illustrates a diagram of a first communications device 700. Communications device 700 may be an implementation of a cluster controller of a cluster of a communications system or a dedicated entity in the communications system that selects operating parameter settings. Communications device 700 may be used to implement various ones of the embodiments discussed herein. As shown in FIG. 7a, a transmitter 705 is configured to send messages, operating parameter settings, utility function results, base station processing order information, and the like, and a receiver 710 is configured to receive messages, operating parameter settings, utility function results, and the like. Transmitter 705 and receiver 710 may have a wireless interface, a wireline interface, or a combination thereof.

A parameter initializing unit 720 is configured to initialize operating parameters for base stations in a cluster controlled by communications device 700. Parameter initializing unit 720 may initialize the operating parameter settings to default or pre-specified settings or to previously selected settings. A parameter selecting unit 722 is configured to select operating parameter settings for base stations in the cluster controlled by communications device 700. Parameter selecting unit 722 may operate in a distributed manner or a centralized manner. Detailed descriptions of parameter selecting unit 722 for distributed operation and centralized operation is provided below. A parameter sharing unit 724 is configured to share the operating parameter settings with other base station in the cluster as well as base stations outside of the cluster. A memory 730 is configured to store initialized operating parameter settings, selected operating parameter settings, processing order information, utility function results, and the like.

The elements of communications device 700 may be implemented as specific hardware logic blocks. In an alternative, the elements of communications device 700 may be implemented as software executing in a processor, controller, application specific integrated circuit, or so on. In yet another alternative, the elements of communications device 700 may be implemented as a combination of software and/or hardware.

As an example, transmitter 705 and receiver 710 may be implemented as a specific hardware block, while parameter initializing unit 720, parameter selecting unit 722, and parameter sharing unit 724 may be software modules executing in a processor 715, such as a microprocessor, a digital signal processor, a custom circuit, or a custom compiled logic array of a field programmable logic array.

Figure 7B:
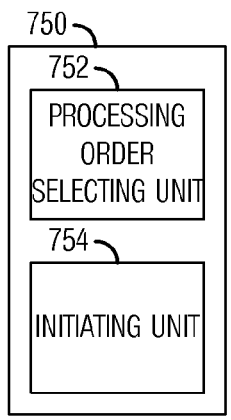
FIG. 7b illustrates a detailed view of an example parameter selecting unit that operates in a distributed manner according to example embodiments described herein.

FIG. 7b illustrates a detailed view of parameter selecting unit 750 that operates in a distributed manner. In general, when operating in the distributed manner, parameter selecting unit 750 off-loads operations to select the operating parameter settings to base stations in the cluster. A processing order selecting unit 752 is configured to select an operating parameter setting selecting order for base stations in the cluster. As an example, the selected processing order may be made according to factors such as base station type, distance from cluster controller, bandwidth of a connection with the cluster controller, a number of UE supported by the base stations, priority of UE supported by the base stations, and the like. An initiating unit 754 is configured to initiate operations at base stations in the cluster according to the operating parameter setting selecting order to select operating parameter settings for the base stations in the cluster.

Figure 7C:
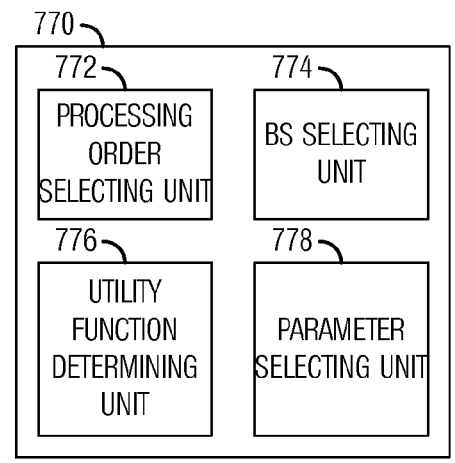
FIG. 7c illustrates a detailed view of an example parameter selecting unit that operates in a centralized manner according to example embodiments described herein.

FIG. 7c illustrates a detailed view of parameter selecting unit 770 that operates in a centralized manner. In general, when operating in the centralized manner, parameter selecting unit 770 performs the operations to select the operating parameter settings of base stations in the cluster. A processing order selecting unit 772 is configured to select an operating parameter setting selecting order for base stations in the cluster. As an example, the selected processing order may be made according to factors such as base station type, distance from cluster controller, bandwidth of a connection with the cluster controller, a number of UE supported by the base stations, priority of UE supported by the base stations, and the like.

A base station selecting unit 774 is configured to select a base station according to the operating parameter setting selecting order that has not had its operating parameter settings selected. A utility function determining unit 776 is configured to determine utility function results according to possible operating parameter settings, initialized operating parameter settings, selected operating parameter settings, initialized settings for base stations not in the cluster, or a combination thereof. A parameter selecting unit 778 is configured to determine summations of utility function results associated with various potential operating parameter settings to optimize the operating parameter setting selection, by selecting an operating parameter setting that maximizes (or minimizes), for example, the summation.

Figure 8:
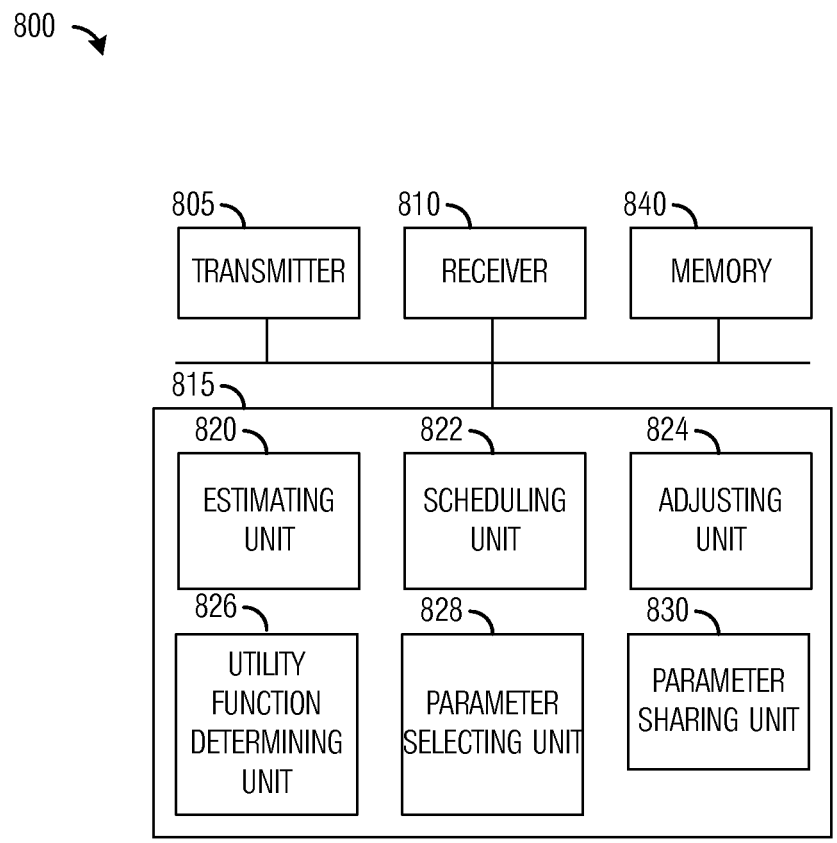
FIG. 8 illustrates an example first communications device according to example embodiments described herein.

FIG. 8 illustrates a diagram of a second communications device 800. Communications device 800 may be an implementation of a base station of a cluster of a communications system. Communications device 800 may be used to implement various ones of the embodiments discussed herein. As shown in FIG. 8, a transmitter 805 is configured to send messages, operating parameter settings, utility function results, and the like, and a receiver 810 is configured to receive messages, operating parameter settings, utility function results, and the like. Transmitter 805 and receiver 810 may have a wireless interface, a wireline interface, or a combination thereof.

An estimating unit 820 is configured to estimate a metric (such as, a SINR, a SNR, and the like) for UEs served by communications device 800. A scheduling unit 822 is configured to schedule UEs for transmission according to the estimated metric. According to an example embodiment, scheduling unit 822 selects UEs from its UEs according to the estimated metric. As an example, scheduling unit 822 may select UEs with high SINR values over UEs with low SINR values. According to an example embodiment, scheduling unit 822 may also use other selection criterion to select the UEs. Other selection criterion may include UE priority, available network resources, UE service history, amount of information to transmit to a UE, and the like. An adjusting unit 824 is configured to adjust a data rate for the scheduled UEs according to the estimated metric. As an example, the base station may reduce the data rate for a first scheduled UE if its estimated metric (e.g., SINR) is low, while the base station may increase the data rate for a second scheduled UE if its estimated metric is high.

A utility function determining unit 826 is configured to determine utility function results according to possible operating parameter settings, initialized operating parameter settings, selected operating parameter settings, initialized settings for base stations in the cluster, initialized settings for base stations not in the cluster, or a combination thereof. A parameter selecting unit 828 is configured to determine summations of utility function results associated with various potential operating parameter settings to optimize the operating parameter settings, by selecting an operating parameter setting that maximizes (or minimizes), for example, the summation. An operating parameter sharing unit 830 is configured to share the operating parameter settings with other base stations, as well as a cluster controller. A memory 840 is configured to store initialized operating parameter settings, selected operating parameter settings, processing order information, utility function results, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while estimating unit 820, scheduling unit 822, adjusting unit 824, utility function determining unit 826, parameter selecting unit 828, and parameter sharing unit 830 may be software modules executing in a processor 815, such as a microprocessor, a digital signal processor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for configuring a first internal base station within a non-overlapping cluster in a communications system having a plurality of non-overlapping clusters, the method comprising:

using, after the plurality of non-overlapping clusters is established, a first utility function to generate a first result according to a first parameter setting of an operating parameter of the first internal base station within the cluster, an internal initialized parameter setting of the operating parameter of a second internal base station within the cluster, and an external initialized parameter setting of the operating parameter of an external base station outside the cluster;

using, after the plurality of non-overlapping clusters is established, the first utility function to generate a second result according to a second parameter setting of the operating parameter of the first internal base station within the cluster, the internal initialized parameter setting of the operating parameter of the second internal base station, and the external initialized parameter setting of the operating parameter of the external base station;

receiving, after the plurality of non-overlapping clusters is established, a third result from the second internal base station, the third result generated by a second utility function using the first parameter setting of the first internal base station, the internal initialized parameter setting of the second internal base station, and the external initialized parameter setting of the external base station;

receiving, after the plurality of non-overlapping clusters is established, a fourth result from the second internal base station, the fourth result generated by the second utility function using the second parameter setting of the first internal base station, the internal initialized parameter setting of the second internal base station, and the external initialized parameter setting of the external base station;

selecting one of the first and second parameter settings of the first internal base station according to a comparison of a summation of the first result and the third result with a summation of the second result and the fourth result, thereby producing a first selected parameter setting; and using the first selected parameter setting as a new initialized parameter setting for the first internal base station.

2. The method of claim 1, wherein selecting the one of the first and second parameter settings is according to a weighted utility function result of the external base station outside the cluster.

3. The method of claim 2, wherein the weighted utility function result is determined from values arising from an application of a mathematical function to the first result, an application of the mathematical function to the second result, an application of the mathematical function to the third result, an application of the mathematical function to the fourth result, and an application of the mathematical function to the weighted utility function result of the external base station outside the cluster.

4. The method of claim 1, wherein using the first selected parameter setting comprises:
using the first utility function to generate a fifth result according to the selected parameter setting, a first parameter setting of the operating parameter of the second internal base station, and the external initialized parameter setting of the operating parameter of the external base station;
using the first utility function to generate a sixth result according to the selected parameter setting, a second parameter setting of the operating parameter of the second internal base station, and the external initialized parameter setting of the operating parameter of the external base station;
transmitting the fifth result and the sixth result to the second internal base station; and
receiving a second selected parameter setting as a new internal initialized parameter setting for the second internal base station.

5. The method of claim 1, further comprising:
exchanging the first selected parameter setting with the external base station; and
repeating using the first utility function to generate the first result, using the first utility function to generate the second result, receiving the third result, receiving the fourth result, and selecting the one of the first and second parameter settings.

6. The method of claim 1, wherein the operating parameter comprises a transmit power level, a precoder index, a modulation and coding scheme of a transmission, a location of a reference signal, a pilot signal boosting level, frequency selective scheduling or frequency diversity scheduling, a handover parameter, antenna tilt, antenna pattern, transmission rank, or a combination thereof.

7. The method of claim 1, wherein selecting the one of the first and second parameter settings comprises:
selecting the first parameter setting of the first internal base station if the summation of the first result and the third result is larger than the summation of the second result and the fourth result; and
selecting the second parameter setting of the first internal base station if the summation of the first result and the third result is smaller than the summation of the second result and the fourth result.

8. The method of claim 1, wherein selecting the one of the first and second parameter settings comprises:
selecting the first parameter setting of the first internal base station if the summation of the first result and the third result is smaller than the summation of the second result and the fourth result; and
selecting the second parameter setting of the first internal base station if the summation of the first result and the third result is larger than the summation of the second result and the fourth result.

9. The method of claim 1, wherein the first selected parameter setting is selected for a subsequent time instance.

10. The method of claim 1, wherein the first selected parameter setting is selected for a subsequent time instance and is valid for a specified number of time instances.

11. The method of claim 1, further comprising:
estimating, for a user equipment served by the first internal base station, a channel metric according to the first selected parameter setting; and
scheduling the user equipment according to the estimated channel metric.

12. The method of claim 11, wherein the channel metric includes a signal to noise plus interference ratio.

13. The method of claim 11, wherein estimating the channel metric is according to the internal initialized parameter setting of the operating parameter of the second internal base station within the cluster, a first pathloss value for a first channel between the first internal base station and the user equipment, a second pathloss value for a second channel between the second internal base station and the user equipment, feedback information provided by the user equipment, or a combination thereof.

14. The method of claim 11, further comprising adjusting a data rate associated with the user equipment according to the estimated channel metric.

15. A communications controller comprising:
a processor;
a non-transitory computer readable storage medium storing programming for execution by the processor, the programming including instructions for:
using, after a plurality of non-overlapping clusters is established, a first utility function to generate a first result according to a first parameter setting of an operating parameter of a first internal base station within a non-overlapping cluster in a communications system having the plurality of non-overlapping clusters, an internal initialized parameter setting of the operating parameter of a second internal base station within the cluster, and an external initialized parameter setting of the operating parameter of an external base station outside the cluster; and using, after the plurality of non-overlapping clusters is established, the first utility function to generate a second result according to a second parameter setting of the operating parameter of the first internal base station within the cluster, the internal initialized parameter setting of the operating parameter of the second internal base station, and the external initialized parameter setting of the operating parameter of the external base station; and a receiver operatively coupled to the processor and configured for:

receiving, after the plurality of non-overlapping clusters is established, a third result from the second internal base station, the third result generated by a second utility function using the first parameter setting of the first internal base station, the internal initialized parameter setting of the second internal base station, and the external initialized parameter setting of the external base station; and receiving, after the plurality of non-overlapping clusters is established, a fourth result from the second internal base station, the fourth result generated by the second utility function using the second parameter setting of the first internal base station, the internal initialized parameter setting of the second internal base station, and the external initialized parameter setting of the external base station;

wherein the programming includes further instructions for:

selecting one of the first and second parameter settings of the first internal base station according to a comparison of a summation of the first result and the third result with a summation of the second result and the fourth result, thereby producing a first selected parameter setting; and using the first selected parameter setting as a new initialized parameter setting for the first internal base station.

16. The communications controller of claim 15, wherein the instructions for selecting the one of the first and second parameter settings comprise instructions for selecting the one of the first and second parameter settings according to a weighted utility function result of the external base station outside the cluster.

17. The communications controller of claim 16, wherein the programming comprises instructions for determining the weighted utility function result from values arising from an application of a mathematical function to the first result, an application of the mathematical function to the second result, an application of the mathematical function to the third result, an application of the mathematical function to the fourth result, and an application of the mathematical function to the weighted utility function result of the external base station outside the cluster.

18. The communications controller of claim 15, wherein the instructions for using the first selected parameter setting comprise instructions for:

using the first utility function to generate a fifth result according to the selected parameter setting, a first parameter setting of the operating parameter of the second internal base station, and the external initialized parameter setting of the operating parameter of the external base station; and using the first utility function to generate a sixth result according to the selected parameter setting, a second parameter setting of the operating parameter of the second internal base station, and the external initialized parameter setting of the operating parameter of the external base station;

wherein the communications controller further comprises a transmitter operatively coupled to the processor and configured for transmitting the fifth result and the sixth result to the second internal base station; and wherein the receiver is further configured for receiving a second selected parameter setting as a new internal initialized parameter setting for the second internal base station.

19. The communications controller of claim 15, wherein the instructions further comprise instructions for:

exchanging the first selected parameter setting with the external base station; and repeating using the first utility function to generate the first result, using the first utility function to generate the second result, receiving the third result, receiving the fourth result, and selecting the one of the first and second parameter settings.

20. The communications controller of claim 15, wherein the operating parameter comprises a transmit power level, a precoder index, a modulation and coding scheme of a transmission, a location of a reference signal, a pilot signal boosting level, frequency selective scheduling or frequency diversity scheduling, a handover parameter, antenna tilt, antenna pattern, transmission rank, or a combination thereof.

21. The communications controller of claim 15, wherein the instructions for selecting the one of the first and second parameter settings comprise instructions for:

selecting the first parameter setting of the first internal base station if the summation of the first result and the third result is larger than the summation of the second result and the fourth result; and selecting the second parameter setting of the first internal base station if the summation of the first result and the third result is smaller than the summation of the second result and the fourth result.

22. The communications controller of claim 15, wherein the instructions for selecting the one of the first and second parameter settings comprise instructions for:

selecting the first parameter setting of the first internal base station if the summation of the first result and the third result is smaller than the summation of the second result and the fourth result; and selecting the second parameter setting of the first internal base station if the summation of the first result and the third result is larger than the summation of the second result and the fourth result.

23. The communications controller of claim 15, wherein the programming includes instructions for selecting the first selected parameter setting for a subsequent time instance.

24. The communications controller of claim 15, wherein the programming includes instructions for selecting the first selected parameter setting for a subsequent time instance, wherein the first selected parameter setting is valid for a specified number of time instances.

25. The communications controller of claim 15, wherein the programming comprises instructions for:

estimating, for a user equipment served by the first internal base station, a channel metric according to the first selected parameter setting; and scheduling the user equipment according to the estimated channel metric.

26. The communications controller of claim 25, wherein the channel metric includes a signal to noise plus interference ratio.

27. The communications controller of claim 25, wherein the instructions for estimating the channel metric comprise instructions for estimating the channel metric according to the internal initialized parameter setting of the operating parameter of the second internal base station within the cluster, a first pathloss value for a first channel between the first internal base station and the user equipment, a second pathloss value for a second channel between the second internal base station and the user equipment, feedback information provided by the user equipment, or a combination thereof.

28. The communications controller of claim 25, wherein the programming comprises instructions for adjusting a data rate associated with the user equipment according to the estimated channel metric.

* * * * *